(12) United States Patent
Mozingo et al.

(10) Patent No.: US 9,296,264 B2
(45) Date of Patent: Mar. 29, 2016

(54) SYSTEM AND METHOD FOR DECREASING TIRE PRESSURE

(71) Applicant: Dana Heavy Vehicle Systems Group, LLC, Maumee, OH (US)

(72) Inventors: Melvin B. Mozingo, Grand Rapids, OH (US); Lloyd G. Racine, Center, ND (US); Jason M. Sidders, Perrysburg, OH (US); Venkata R. Kona, Hyderabad (IN); Kurt P. Gillen, Lambertville, MI (US); Brian V. Knapke, Toledo, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 107 days.

(21) Appl. No.: 14/177,402

(22) Filed: Feb. 11, 2014

(65) Prior Publication Data

US 2014/0224399 A1   Aug. 14, 2014

Related U.S. Application Data

(60) Provisional application No. 61/763,048, filed on Feb. 11, 2013, provisional application No. 61/776,431, filed on Mar. 11, 2013, provisional application No. 61/925,749, filed on Jan. 10, 2014.

(51) Int. Cl.
*B60C 23/00* (2006.01)

(52) U.S. Cl.
CPC .................................. *B60C 23/003* (2013.01)

(58) Field of Classification Search
CPC .... B60C 23/00; B60C 23/001; B60C 23/003; B60C 23/10; B60C 23/16; B60C 29/00; B60C 29/02

USPC .......................................... 152/415–417, 427
See application file for complete search history.

(56) References Cited

U.S. PATENT DOCUMENTS

| 780,986 A | 1/1905 | Francis |
| 1,729,469 A | 9/1929 | Anderson |

(Continued)

FOREIGN PATENT DOCUMENTS

| DE | 102009000394 A1 | 10/2009 |
| DE | 102008062065 A1 | 6/2010 |

(Continued)

OTHER PUBLICATIONS

European Patent Office; The International Search Report and the Written Opinion of the International Searching Authority; Apr. 29, 2014; 9 pages; European Patent Office, Rijswijk, Netherlands.

*Primary Examiner* — John Walters
*Assistant Examiner* — James Triggs
(74) *Attorney, Agent, or Firm* — Marshall & Melhorn, LLC

(57) ABSTRACT

A system is provided. The system includes a wheel assembly which defines a chamber that houses a pressurized fluid. A wheel valve assembly is attached to the wheel assembly and is in fluid communication with the chamber. The wheel valve assembly is operable between an open position and a closed position. The wheel valve assembly includes an area having a first flow capacity. A valve assembly is selectively in fluid communication with the wheel valve assembly. The valve assembly includes an area formed in a perforation that has a second flow capacity. The second flow capacity is less than the first flow capacity.

19 Claims, 13 Drawing Sheets

(56) References Cited

U.S. PATENT DOCUMENTS

| | | | |
|---|---|---|---|
| 2,307,949 A | 1/1943 | Phillips | |
| 2,690,757 A | 10/1954 | Orchowski | |
| 3,105,477 A | 10/1963 | Lowther | |
| 3,165,097 A | 1/1965 | Lowther | |
| 3,503,417 A | 3/1970 | Toda et al. | |
| 3,593,742 A | 7/1971 | Taylor | |
| 3,647,176 A | 3/1972 | Usry | |
| 3,838,717 A * | 10/1974 | Wolf | 141/65 |
| 4,075,294 A | 2/1978 | Saito et al. | |
| 4,428,396 A | 1/1984 | Wall | |
| 4,493,474 A * | 1/1985 | Ohyama | 251/129.01 |
| 4,744,399 A | 5/1988 | Magnuson et al. | |
| 4,924,926 A | 5/1990 | Schultz et al. | |
| 4,969,628 A | 11/1990 | Reich et al. | |
| 5,004,008 A | 4/1991 | Drucker | |
| 5,085,246 A | 2/1992 | Griinke | |
| 5,141,589 A | 8/1992 | Mittal | |
| 5,181,977 A | 1/1993 | Gneiding et al. | |
| 5,244,027 A | 9/1993 | Freigang | |
| 5,249,609 A | 10/1993 | Walker et al. | |
| 5,309,969 A | 5/1994 | Mittal | |
| 5,313,995 A | 5/1994 | Schultz | |
| 5,327,346 A | 7/1994 | Goodell | |
| 5,398,743 A | 3/1995 | Bartos | |
| 5,409,045 A | 4/1995 | Walker et al. | |
| 5,465,772 A | 11/1995 | Sartor | |
| 5,540,268 A * | 7/1996 | Mittal | 152/415 |
| 5,553,647 A | 9/1996 | Jaksic | |
| 5,587,698 A | 12/1996 | Genna | |
| 5,618,361 A | 4/1997 | Colussi et al. | |
| 5,629,873 A | 5/1997 | Mittal et al. | |
| 5,629,874 A | 5/1997 | Mittal | |
| 5,970,996 A | 10/1999 | Markey et al. | |
| 6,098,682 A | 8/2000 | Kis | |
| 6,250,327 B1 | 6/2001 | Freigang et al. | |
| 6,409,055 B1 | 6/2002 | Officier | |
| 6,427,714 B2 | 8/2002 | Freigang et al. | |
| 6,561,017 B1 | 5/2003 | Claussen et al. | |
| 6,604,414 B1 | 8/2003 | Claussen et al. | |
| 6,769,666 B2 | 8/2004 | Hall et al. | |
| 6,779,618 B2 | 8/2004 | Tarasinski | |
| 6,865,930 B1 | 3/2005 | Claussen et al. | |
| 6,894,607 B1 | 5/2005 | Claussen et al. | |
| 6,941,989 B2 | 9/2005 | Grotendorst et al. | |
| 7,028,983 B2 | 4/2006 | Ozaki et al. | |
| 7,051,585 B2 | 5/2006 | Claussen et al. | |
| 7,140,386 B2 | 11/2006 | Avis et al. | |
| 7,265,659 B2 | 9/2007 | Claussen et al. | |
| 7,367,371 B2 | 5/2008 | Meydieu et al. | |
| 7,437,920 B2 | 10/2008 | Beverly et al. | |
| 7,509,969 B2 * | 3/2009 | Huang | 137/226 |
| 7,530,379 B1 | 5/2009 | Becker et al. | |
| 7,538,661 B2 | 5/2009 | Claussen et al. | |
| 7,690,411 B2 | 4/2010 | Wilson | |
| 7,909,076 B2 | 3/2011 | Wilson | |
| 7,950,414 B2 | 5/2011 | Suzuki et al. | |
| 7,963,307 B2 | 6/2011 | Rudolf et al. | |
| 8,047,224 B2 | 11/2011 | Eichler | |
| 8,069,890 B2 | 12/2011 | Resare et al. | |
| 8,087,439 B2 | 1/2012 | Hobe et al. | |
| 8,122,926 B2 | 2/2012 | Rogers | |
| 8,132,607 B2 | 3/2012 | Kusunoki et al. | |
| 8,135,561 B2 | 3/2012 | Lin et al. | |
| 8,245,746 B2 | 8/2012 | Stanczak | |
| 8,344,868 B2 | 1/2013 | Browne et al. | |
| 8,353,311 B2 | 1/2013 | Rigamonti et al. | |
| 8,479,790 B2 | 7/2013 | Resare et al. | |
| 8,479,791 B2 | 7/2013 | Schulte et al. | |
| 8,590,585 B2 | 11/2013 | Rogers | |
| 8,844,596 B2 | 9/2014 | Medley et al. | |
| 2005/0121125 A1 | 6/2005 | Maquaire | |
| 2006/0180256 A1 | 8/2006 | Mittal | |
| 2007/0187015 A1 * | 8/2007 | Alff | 152/418 |
| 2009/0314406 A1 | 12/2009 | Browne et al. | |
| 2009/0314407 A1 | 12/2009 | Browne et al. | |

FOREIGN PATENT DOCUMENTS

| | | |
|---|---|---|
| DE | 102008062072 A1 | 6/2010 |
| EP | 1031899 A2 | 8/2000 |

* cited by examiner

SYSTEM AND METHOD FOR DECREASING TIRE PRESSURE

CROSS-REFERENCE TO RELATED APPLICATIONS

This application is claiming the benefit, under 35 U.S. C. 119(e), of the provisional applications granted Ser. No. 61/763,048 filed on Feb. 11, 2013, 61/776,431 filed on Mar. 11, 2013 and 61/925,749 filed on Jan. 10, 2014 the entire disclosures of which are hereby incorporated by reference.

BACKGROUND OF THE INVENTION

The invention relates to a system and a method for decreasing tire pressure.

Certain types of vehicles such as, for example, tractors used for farming require that the tire pressure of their wheel assemblies be periodically adjusted for optimal performance. Generally, these types of vehicles have large volume wheel assemblies which operate over a wide range of tire pressures. Current systems for decreasing the tire pressures of one or more wheel assemblies having a large volume and wide operating pressure range are limited by cost, complexity and the rate at which the tire pressures can be decreased.

Therefore, it would be desirable to provide a system and method which was less expensive and complex than those known and can decrease the tire pressure quickly.

BRIEF SUMMARY OF THE INVENTION

A system is provided. In an embodiment, the system comprises a wheel assembly which defines a chamber that houses a pressurized fluid. A wheel valve assembly attached to the wheel assembly and in fluid communication with the chamber. The wheel valve assembly is operable between an open position and a closed position. The wheel valve assembly comprises an area having a first flow capacity. A valve assembly is selectively in fluid communication with the wheel valve assembly. The valve assembly comprises an area formed in a perforation that has a second flow capacity. The second flow capacity is less than the first flow capacity.

BRIEF DESCRIPTION OF THE DRAWINGS

The above, as well as other advantages of the present invention will become readily apparent to those skilled in the art from the following detailed description when considered in the light of the accompanying drawings in which:

FIG. 5A is a cross-sectional view of the valve assembly of FIG. 3 along line 5A-5A under certain conditions;

DETAILED DESCRIPTION OF THE INVENTION

Figure 1:
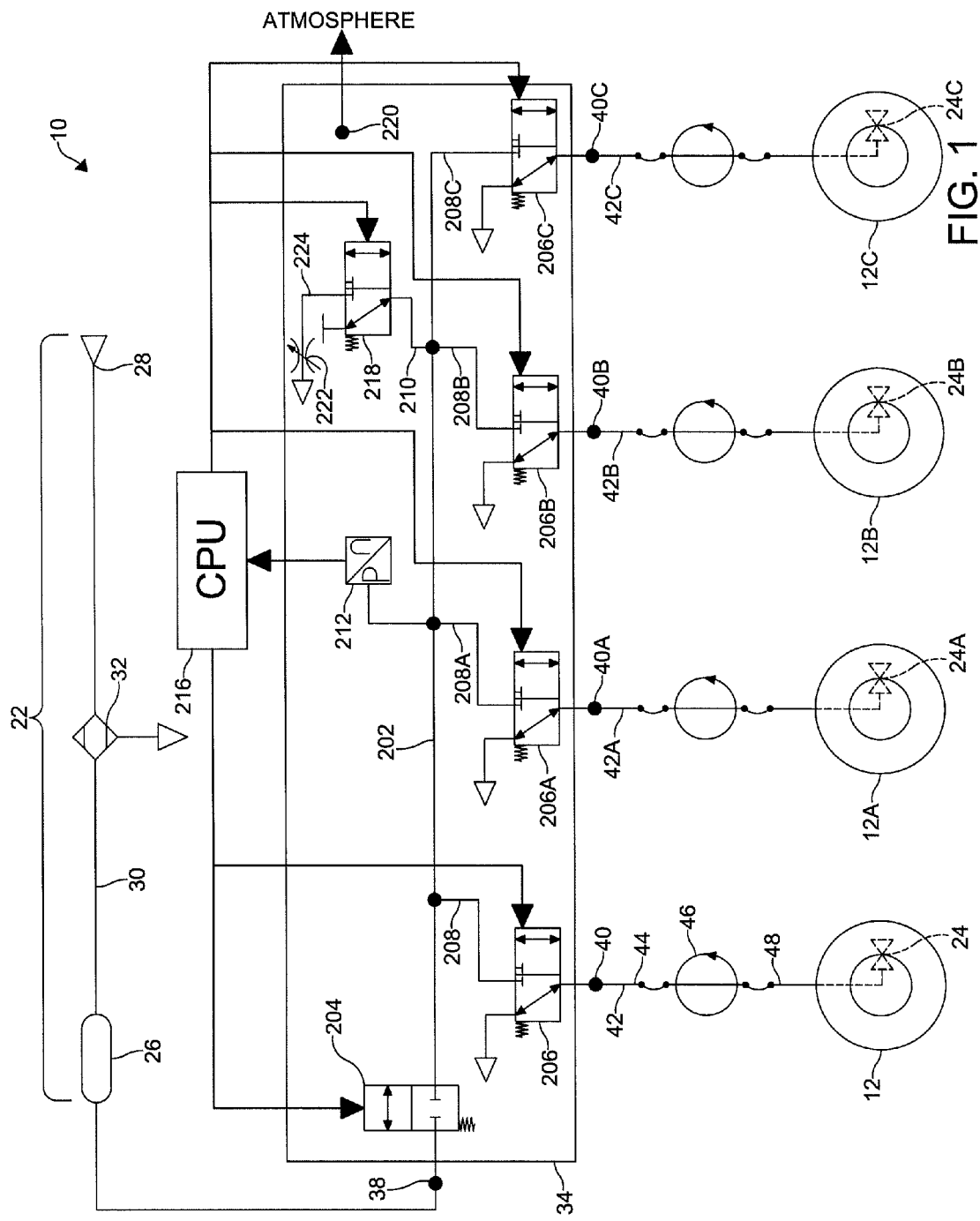
FIG. 1 is a schematic view of an embodiment of the system in accordance with the invention.

It is to be understood that the invention may assume various alternative orientations and step sequences, except where expressly specified to the contrary. It is also to be understood that the specific systems, methods, assemblies and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

A system and a method for decreasing tire pressure are described herein. With reference to FIGS. 1-13, certain embodiments of the system 10 and the method will now be described.

The system and method described herein may be utilized with a vehicle (not depicted) such as, for example, a passenger, commercial or off-highway vehicle. Also, the system and method could have industrial, locomotive, and aerospace applications.

Figure 2:
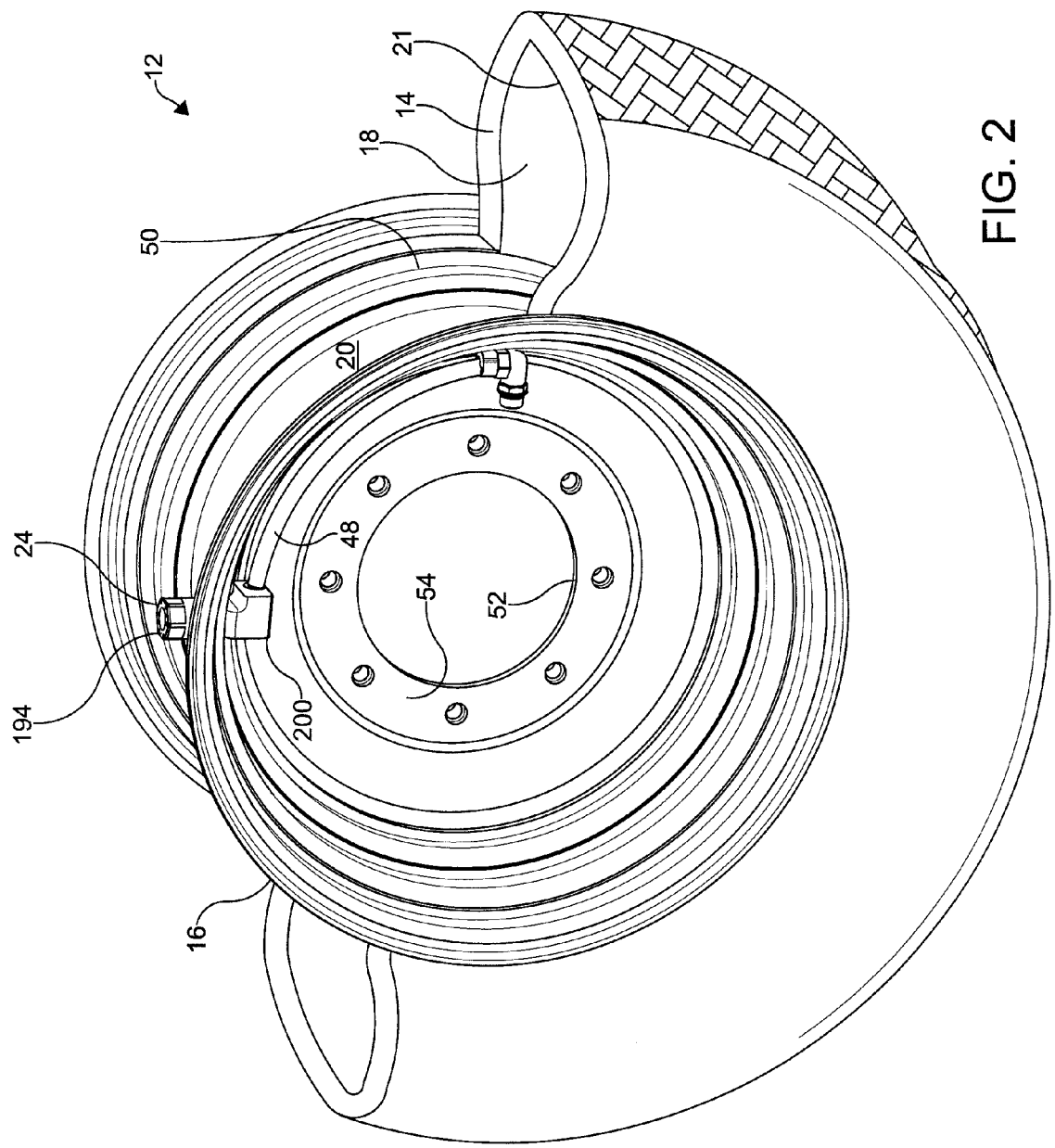
FIG. 2 is a partial perspective view of a wheel assembly in accordance with the system of FIG. 1.
Figure 3:
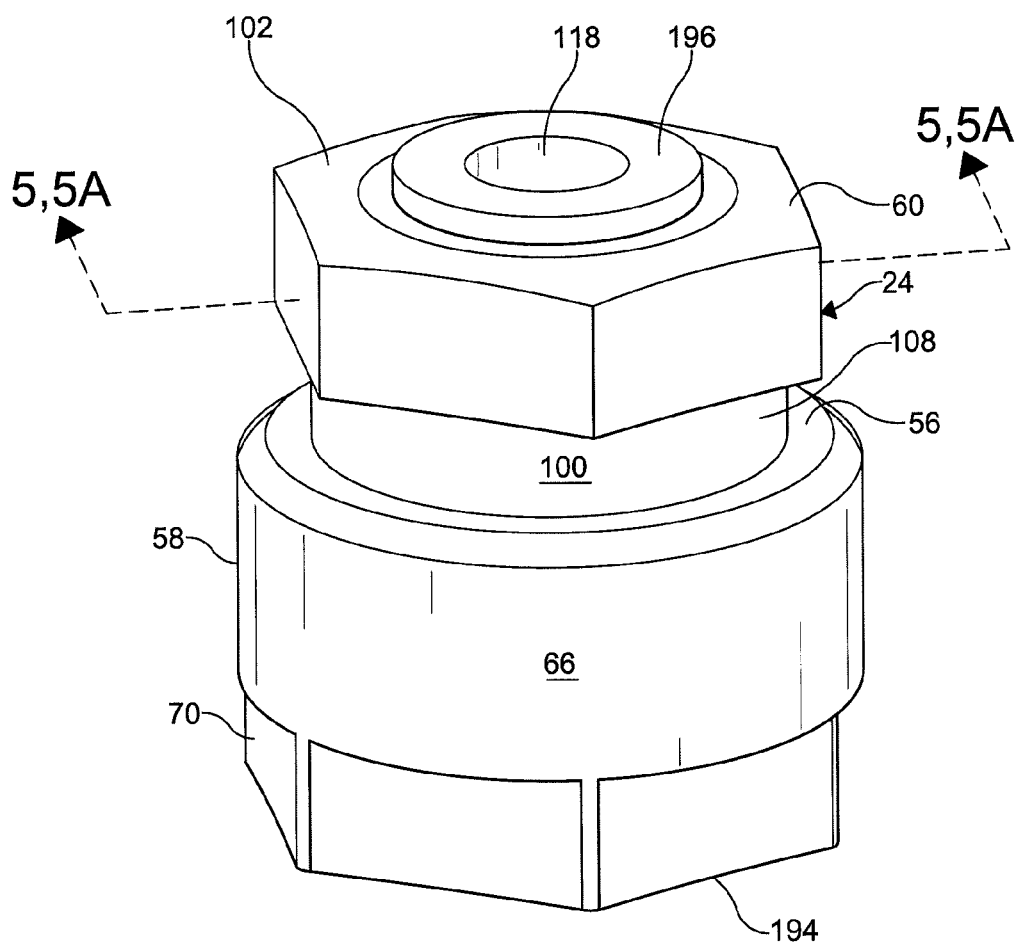
FIG. 3 is a perspective view of an embodiment of a wheel valve assembly in accordance with the system of FIG. 1.

The vehicle comprises a wheel assembly 12. The wheel assembly 12 comprises a tire 14 and a wheel rim 16. An axle shaft (not depicted) may be coupled to the wheel assembly 12, specifically, the wheel rim 16. A chamber 18, which is partially depicted in FIG. 2, is defined by an outer surface 20 of the wheel rim 16 and an inner surface 21 of the tire 14. The chamber 18 is configured to house a pressurized fluid. For describing the system and method, the pressurized fluid will hereinafter be referred to as air. However, alternative fluids may be housed in the chamber.

The pressure of the air within the chamber 18 will hereinafter be referred to as "tire pressure." Tire pressure is increased by allowing air into the chamber 18 and decreased by removing air from the chamber 18. The system and method will be described primarily with reference to one wheel assembly 12 and decreasing the tire pressure thereof. However, the system and method are not limited to use with only one wheel assembly as both are suitable for use with a plurality of wheel assemblies 12, 12A, 12B, 12C and decreasing the tire pressures thereof simultaneously. Preferably, each wheel assembly 12, 12A, 12B, 12C is as described above.

Figure 13:
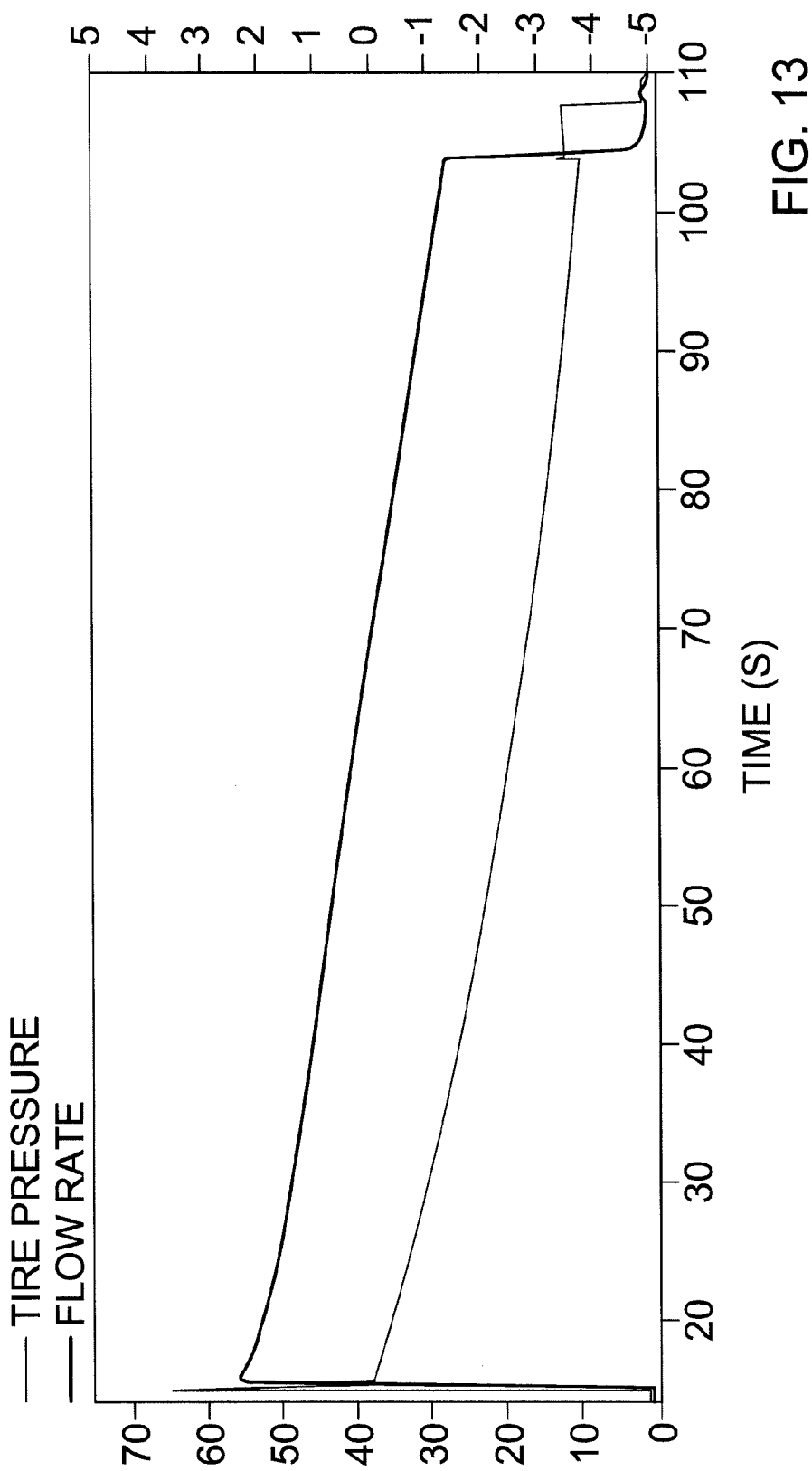
FIG. 13 is a graph which illustrates pressure and flow rate versus time in accordance with an embodiment of the invention.

In an embodiment, a target tire pressure may be selected for the wheel assembly 12. In other embodiments, the system and method can be practiced so that a target tire pressure is selected for one or more wheel assemblies 12, 12A, 12B, 12C. In certain embodiments, the tire pressure may be selected to be about 100 psi or more. For example, the tire pressure may be selected to be about 110 psi. In other embodiments, the tire pressure may be selected to be less than 100 psi. For example, the tire pressure may be selected to be about 40 psi. Advantageously, the system 10 allows the tire pressure to be increased or decreased to the target tire pressure. For example, the tire pressure may be decreased from about 110 psi to about 60 psi or, as illustrated in FIG. 13, from about 40 psi to about 10 psi. Alternatively, the tire pressure may be increased from about 60 psi to about 110 psi or from about 10 psi to about 40 psi.

Utilizing the system 10 and method described herein reduces the time in which it takes to increase or decrease the tire pressure of one or more wheel assemblies 12, 12A, 12B, 12C over the known systems and methods. For example, in certain embodiments, it may be desired to decrease the tire pressure of two or more wheel assemblies 12, 12A from about 110 psi to about 60 psi or, as illustrated by FIG. 13, it may be desired to decrease the tire pressure for the wheel assemblies 12, 12A from about 40 psi to about 10 psi. In these embodiments, the aforementioned target tire pressures can be reached in less than 2 minutes utilizing the system 10 and method described herein.

As best shown in FIG. 1, air is supplied to the wheel assembly 12 from an air source 22. The air source 22 supplies air which is at a pressure that is greater than the tire pressure. The air source 22 and pressurized air supplied therefrom is utilized to open a wheel valve assembly 24 and increase the tire pressure when desired. Preferably, the air source 22 comprises a reservoir 26 such as, for example, a wet tank. A compressor 28 is in fluid communication with the wet tank via a supply conduit 30 and supplies pressurized air thereto for storage therein. In certain embodiments, a drier 32 is interposed in the supply conduit 30 for removing water from the air. A filter (not depicted) may also be interposed in the supply conduit 30.

The air source 22 is in fluid communication with a pneumatic control unit 34 via the supply conduit 30. The pneumatic control unit 34 is utilized in increasing, decreasing, and measuring the tire pressure. The pneumatic control unit 34 may also be utilized in venting the system 10. The pneumatic control unit 34 is mounted to a portion of the vehicle such as, for example, an outer surface 35 of an axle housing 37.

Figure 8:
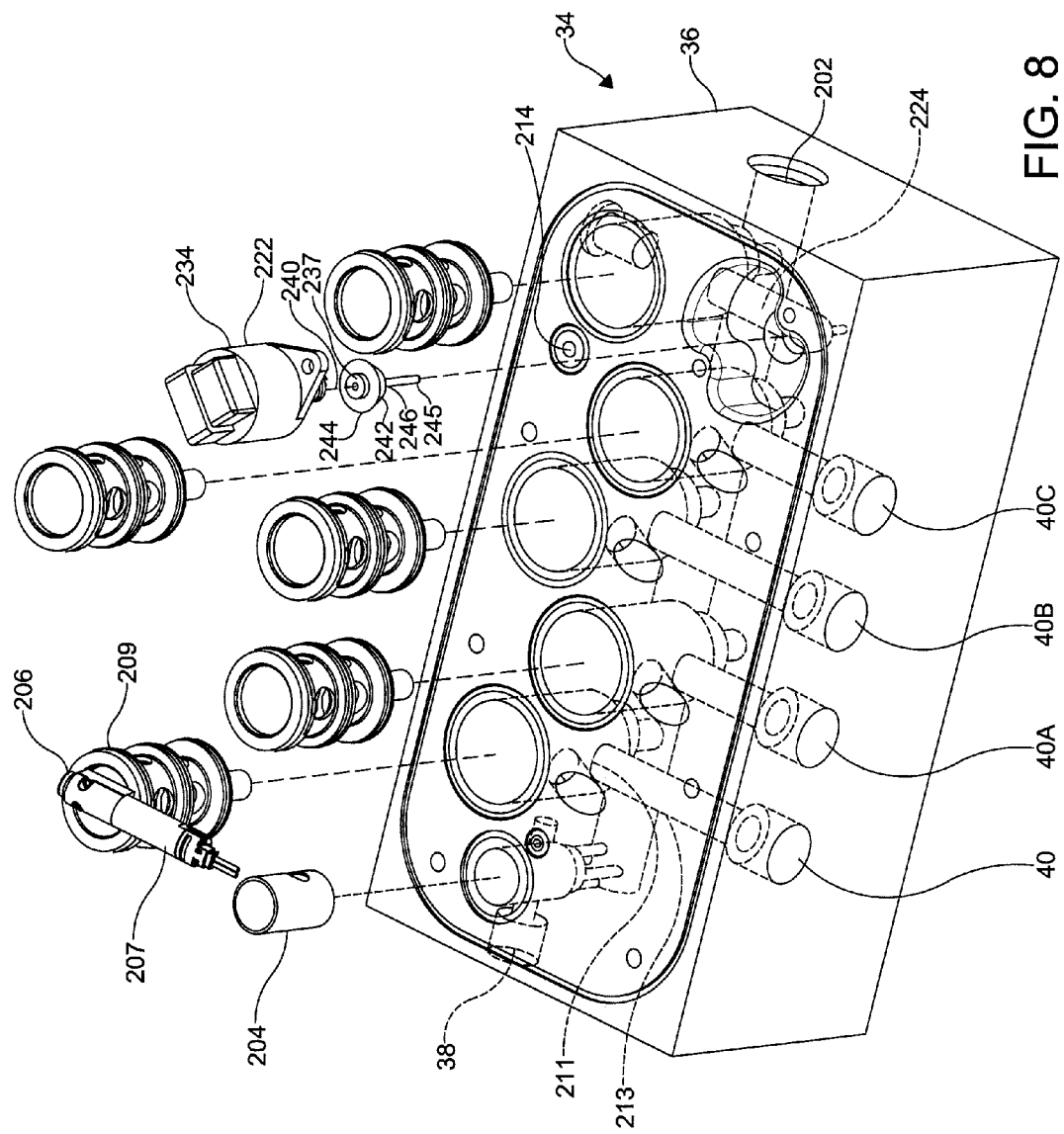
FIG. 8 is a perspective phantom exploded view of portions of a pneumatic control unit in accordance with the system of FIG. 1.
Figure 9:
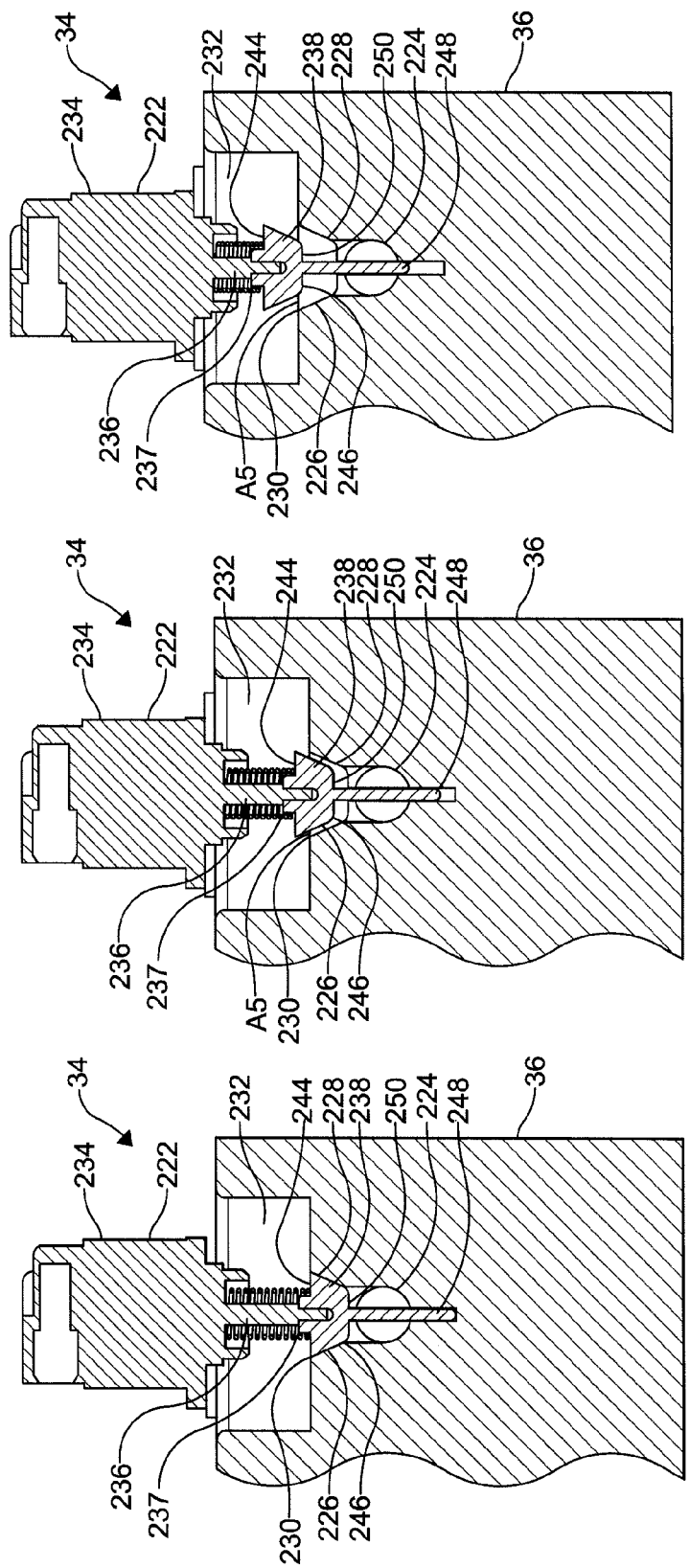
FIG. 9A is a cross-sectional view of a portion of the pneumatic control unit of FIG. 8 under certain conditions.
FIG. 9B is a cross-sectional view of a portion of the pneumatic control unit of FIG. 8 under certain conditions.
FIG. 9C is a cross-sectional view of a portion of the pneumatic control unit of FIG. 8 under certain conditions.

As illustrated best in FIG. 8, where portions of the pneumatic control unit 34 have been removed for clarity, the pneumatic control unit 34 comprises a body portion 36. An air supply port 38 and a channel port 40 are formed in the body portion 36. Separate channel ports 40, 40A, 40B, 40C may be provided for each wheel assembly 12, 12A, 12B, 12C capable of fluid communication with the system 10. The air supply port 38 and the channel port 40 may each include a threaded portion (not depicted) for attaching separate fluid conduits 30, 44 to the pneumatic control unit 34. As illustrated in FIG. 1, the air supply port 38 is attached to the supply conduit 30 and the channel port 40 is attached to a separate fluid conduit 44.

The channel port 40 is in fluid communication with a wheel valve assembly 24 via a fluid control circuit 42. Preferably, each wheel valve assembly 24, 24A, 24B, 24C of the system 10 is in fluid communication with a channel port 40, 40A, 40B, 40C via a fluid control circuit 42, 42A, 42B, 42C provided therebetween. The fluid control circuit 42 comprises a first fluid conduit 44 attached to and in fluid communication with the channel port 40 and a rotary joint 46. Also, the fluid control circuit 42 comprises a second fluid conduit 48 in fluid communication with the rotary joint 46 and the wheel valve assembly 24. Preferably, each fluid control circuit 42, 42A, 42B, 42C comprises a first fluid conduit 44, rotary joint 46 and second fluid conduit 48 as described herein.

The rotary joint 46 allows a portion of the fluid control circuit 42 to rotate with the wheel assembly 12 and another portion of the fluid control circuit 42 to remain stationary. The rotating and stationary portions of the fluid control circuit 42 are in fluid communication via the rotary joint 46. In certain embodiments, the rotary joint 46 allows the first fluid conduit 44 to remain stationary with the wheel assembly 12 and the second fluid conduit 48 to rotate.

Figure 7:
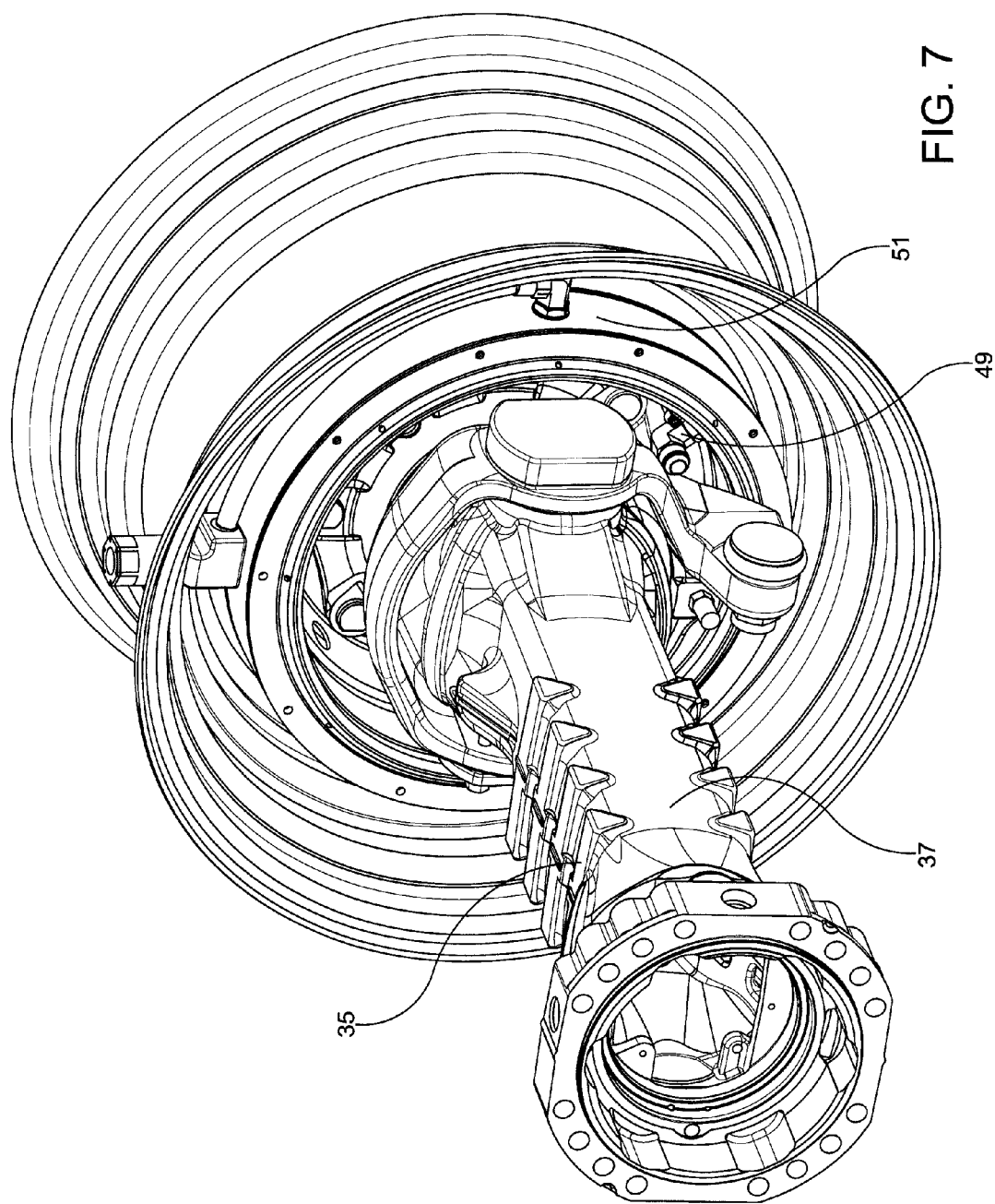
FIG. 7 is a perspective view of portions of the system of FIG. 1.

As illustrated in FIG. 7, the rotary joint 46 may be disposed about the axle housing 37 and comprise an inner portion 49 and an outer portion 51. The inner portion 49 and the outer portion 51 may be concentric. The inner portion 49 may be stationary and the outer portion 51 may rotate with the wheel assembly 12. Preferably, the inner portion 49 and outer portion 51 are sealingly engaged and in fluid communication. A channel (not depicted) may be defined by the inner portion and the outer portion to enable fluid communication through the rotary joint 46.

The fluid control circuit 42 is selectively in fluid communication with the chamber 18 via the wheel valve assembly 24. Preferably, the wheel valve assembly 24 is attached to the wheel assembly 12 and is operable between an open position and a closed position for increasing or decreasing the tire pressure. Preferably, the wheel valve assembly 24 is attached to the wheel rim 16 via a threaded connection. More preferably, as illustrated in FIG. 2, the wheel valve assembly 24 is attached to the outer surface 50 of the wheel rim 26. However, in other embodiments (not depicted), the wheel valve assembly is attached to another surface of the wheel rim. For example, the wheel valve assembly may be attached to an inner surface 52, inboard surface 54 or outboard surface (not depicted) of the wheel rim. Preferably, each wheel valve assembly 24, 24A, 24B, 24C in fluid communication with the system 10 is attached to a separate wheel assembly 12, 12A, 12B, 12C as described above.

Figure 5:
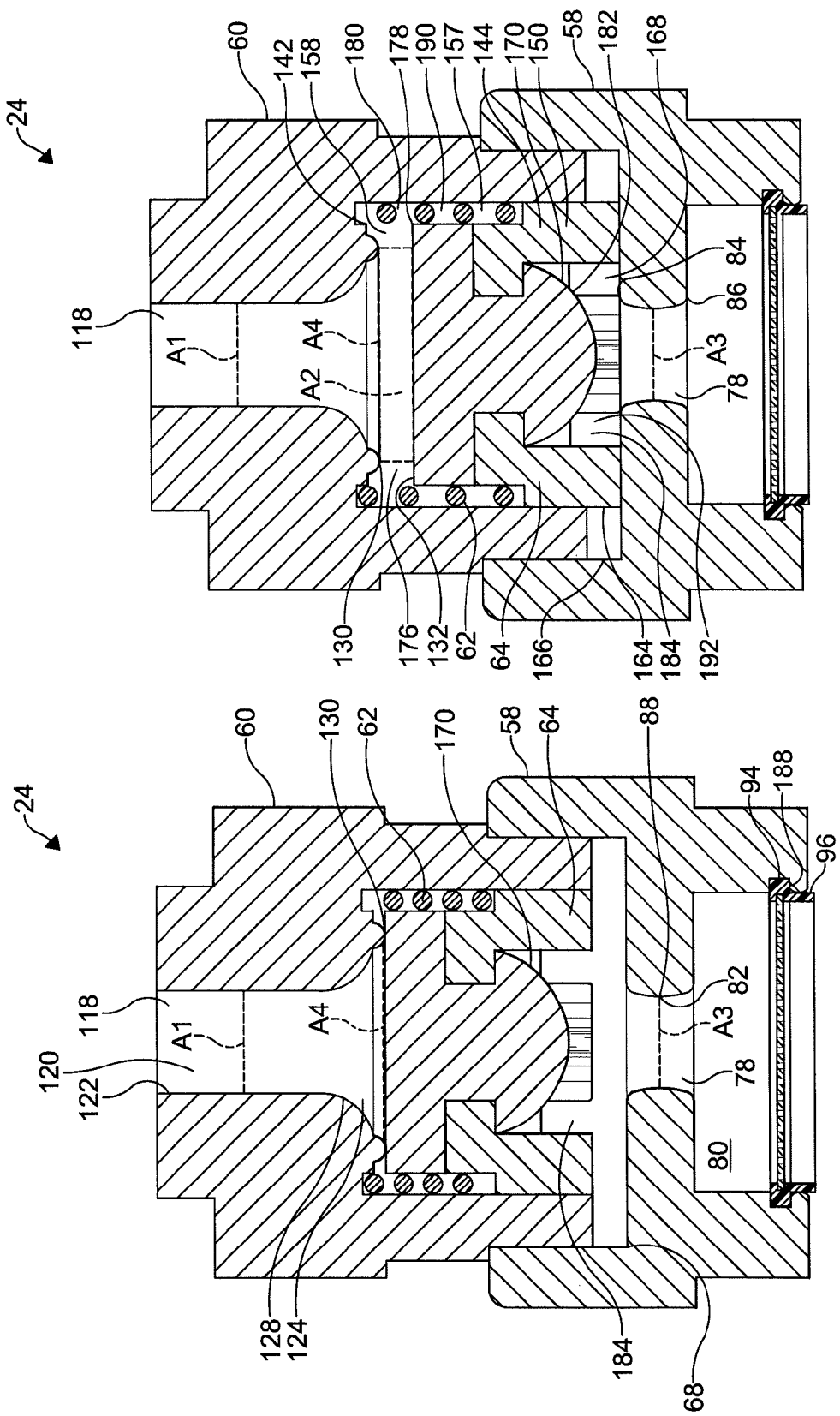
FIG. 5 is a cross-sectional view of the valve assembly of FIG. 3 along line 5-5 under certain conditions.

Preferably, each wheel valve assembly 24, 24A, 24B, 24C in fluid communication with the system 10 is configured as described below. FIG. 5A illustrates the wheel valve assembly 24 in the open position. In the open position, the wheel valve assembly 24 allows air to be added to or removed from the chamber 18 so that the tire pressure can be increased or decreased. FIG. 5 illustrates the wheel valve assembly 24 in the closed position. In the closed position, the wheel valve assembly 24 prevents air from being added to or removed from the wheel assembly 12.

Embodiments of the preferred wheel valve assembly 24 are described in PCT application serial no. 2013/049915, the entire disclosure of which is hereby incorporated by reference in its entirety. However, it should be appreciated that the wheel valve assembly 24 is not limited to the embodiments disclosed in PCT application serial no. 2013/049915.

Referring now to FIGS. 3, 4, 5, 5A and 6, the wheel valve assembly 24 comprises a housing 56. The housing 56 is preferably metallic. However, it should be understood that the housing may be formed utilizing other materials. The housing 56 may be formed in a unitary manner or by joining a plurality of components. Preferably, the housing 56 comprises a base portion 58 and a cap portion 60. The wheel valve assembly 24 also comprises a biasing member 62 and a shuttle assembly 64.

The base portion 58 is a generally annular member into which the cap portion 56, biasing member 62 and shuttle assembly 64 are partially disposed. The base portion 58 comprises an outer wall portion 66, a lower wall portion 68, and a stem portion 70. Preferably, the base portion 58 is unitarily formed by casting a metal. However, it should be understood that the base portion 58 may be formed using other materials and processes. It should also be understood that the base portion 58 may be formed by joining a plurality of components.

The outer wall portion 66 is of a generally cylindrical shape. The outer wall portion 66 is attached to the lower wall portion 68 at a first end thereof and extends away therefrom. The outer wall portion 66 and the lower wall portion 68 define a base cavity. Preferably, an inner face 74 of the outer wall portion 66 includes a thread portion formed thereon for engaging a thread portion formed on the cap portion 56. An outer face 76 of the outer wall portion 66 may be knurled. In other embodiments (not depicted), the outer face of the outer wall portion may include a thread portion formed thereon for engaging a thread formed in a component the valve assembly is coupled to.

The lower wall portion 68 is attached to the outer wall portion 66 on a side and the stem portion 70 on an opposite side thereof. The lower wall portion 68 is in a perpendicular relationship with both the outer wall portion 66 and the stem portion 70. The lower wall portion 68 defines a perforation 78 formed in the base portion 58, which hereinafter may also be referred to as the "base perforation." The base perforation 78 extends through the lower wall portion 68 and allows the base cavity to communicate with a stem cavity 80.

The base perforation 78 is shaped to militate against pressure losses that occur as fluid flows through an orifice constriction and to set a relative flow rate of the fluid that enters the base cavity or the stem cavity 80. The base perforation 78 has a diameter 82 which is of a length that varies radially and may be of a generally hourglass shape. Alternately, the base perforation may be of another shape that militates against pressure losses that occur as a fluid flows through an orifice constriction. In an embodiment, the diameter 82 of the base perforation 78 varies from a first end 84 to a second end 86. In this embodiment, it is preferred that the diameter 82 of the base perforation 78 gradually decreases in length from the first end 84 adjacent the base cavity to a reduced diameter in a center portion 88 of the lower wall portion 68 and then gradually increases in length along a remaining portion of the lower wall portion 68 to the second end 86 adjacent the stem cavity 80. In other embodiments (not depicted), the varying diameter of the base perforation may be defined by a pair of circular fillets formed in the lower wall portion or by other conic sections.

The stem portion 70 is of a generally cylindrical shape. The stem portion 70 is attached to the lower wall portion 68 at a first end thereof and extends away therefrom. The lower wall portion 68 and the stem portion 70 define the stem cavity 80. Preferably, an inner face of the stem portion 70 includes a groove 94 formed therein for engaging a filter 96. As illustrated in FIGS. 5 and 5A, the filter 96 is at least partially disposed in the stem cavity. In other embodiments (not depicted), the inner face may include a thread portion formed thereon for engaging a thread portion formed on the filter or another portion of the assembly. In still other embodiments (not depicted), a thread portion may be formed on an outer face of the stem portion for engaging a thread portion formed on the filter or another portion of the assembly.

The cap portion 56 is attached to the base portion 58. The cap portion 56 is an annular member into which the shuttle assembly 64 and the biasing member 62 are partially disposed. The cap portion 56 comprises an outer wall portion 100 and the upper wall portion 102. The outer wall portion 100 and the upper wall portion 102 define a cap cavity. Preferably, the cap portion 56 is unitarily formed by casting a metal. However, it should be understood that the cap portion 56 may be formed using other materials and processes. It should also be understood that the cap portion 56 may be formed by joining a plurality of components.

The outer wall portion 100 is of a substantially cylindrical shape. The outer wall portion 100 is attached to the upper wall portion 102 at a first end thereof and extends away therefrom. An outer face 108 of the outer wall portion 100 may be of a stepped configuration and include a thread formed thereon for engaging the thread formed on the inner face 74 of the base portion 58. At least a portion of the outer face 108 may be shaped to facilitate turning the cap portion 56 during assembly or disassembly of the wheel valve assembly 24.

The upper wall portion 102 is substantially ring-shaped. The upper wall portion 102 is attached to the outer wall portion 100 at an outer edge portion thereof. The outer wall portion 100 and an inner face of the upper wall portion 102 define a groove. The groove is an annular recess which receives a second member end 116 of the biasing member 62.

The upper wall portion 102 defines a cap perforation 118. The cap perforation 118 is formed through the upper wall portion 102 and is aligned with the base perforation 78. The second fluid conduit 48 is in fluid communication with the wheel valve assembly 24 via the cap perforation 118. An outer groove (not depicted) may be formed in the upper wall portion 102. The outer groove may abut and be disposed about an annular portion. In other embodiments (not depicted), a portion of the upper wall portion 102 separates the outer groove from the annular member.

The cap perforation 118 is shaped to militate against pressure losses that occur as a fluid flows through an orifice constriction and to set a relative flow rate for the fluid as it is directed through the wheel valve assembly 24. The cap perforation 118 has a first portion 120 which has a diameter 122 of a length that is substantially constant and a second portion 124 which has a diameter 126 of a length which varies. The first portion 120 is preferably of a cylindrical shape. The second portion 124 is defined by a rounded portion 128 of the upper wall portion 102 and gradually increases in diameter to a ridge 130 included on the inner face. The diameter 126 of the second portion 124 is greater than the diameter 122 of the first portion 120. Alternately, the cap perforation may be of or defined by other shapes that militate against pressure losses that occur as a fluid flows through an orifice constriction. For example, in an embodiment (not depicted), the second portion may be defined by a pair of circular fillets formed in the upper wall portion and the inner face. Additionally, in other embodiments (not depicted), the first portion and/or second portion may be defined by other conic sections. Furthermore, it should be understood that the upper wall portion may include at least one additional feature to facilitate applying a pressurized fluid to the cap cavity. In certain embodiments (not depicted), the at least one additional feature may be one of a hollow cylindrical protuberance extending from the upper wall portion, a thread formed in the upper wall portion, or a fitting adapted to receive a coupling.

The ridge 130 is formed about and abuts the second end of the cap perforation 118. The ridge 130 is shaped to militate against pressure losses that occur as a fluid flows through an orifice constriction. When the wheel valve assembly 24 is in the closed position, a sealing surface 132 of a plug member 134 abuts and sealingly contacts the ridge 130. The ridge 130 is an annular body and has a hemispherical cross-section. However, it should be appreciated that the cross-section of the ridge may be of other shapes.

The inner face comprises a first portion. The first portion is an annular portion and separates the ridge 130 from the groove. The first portion includes a first surface which is attached to the ridge 130 and a second surface which defines a portion of the groove. Preferably, the first surface and second surface are attached to each other to provide the first portion with a sharply defined edge portion 142.

Figure 4:
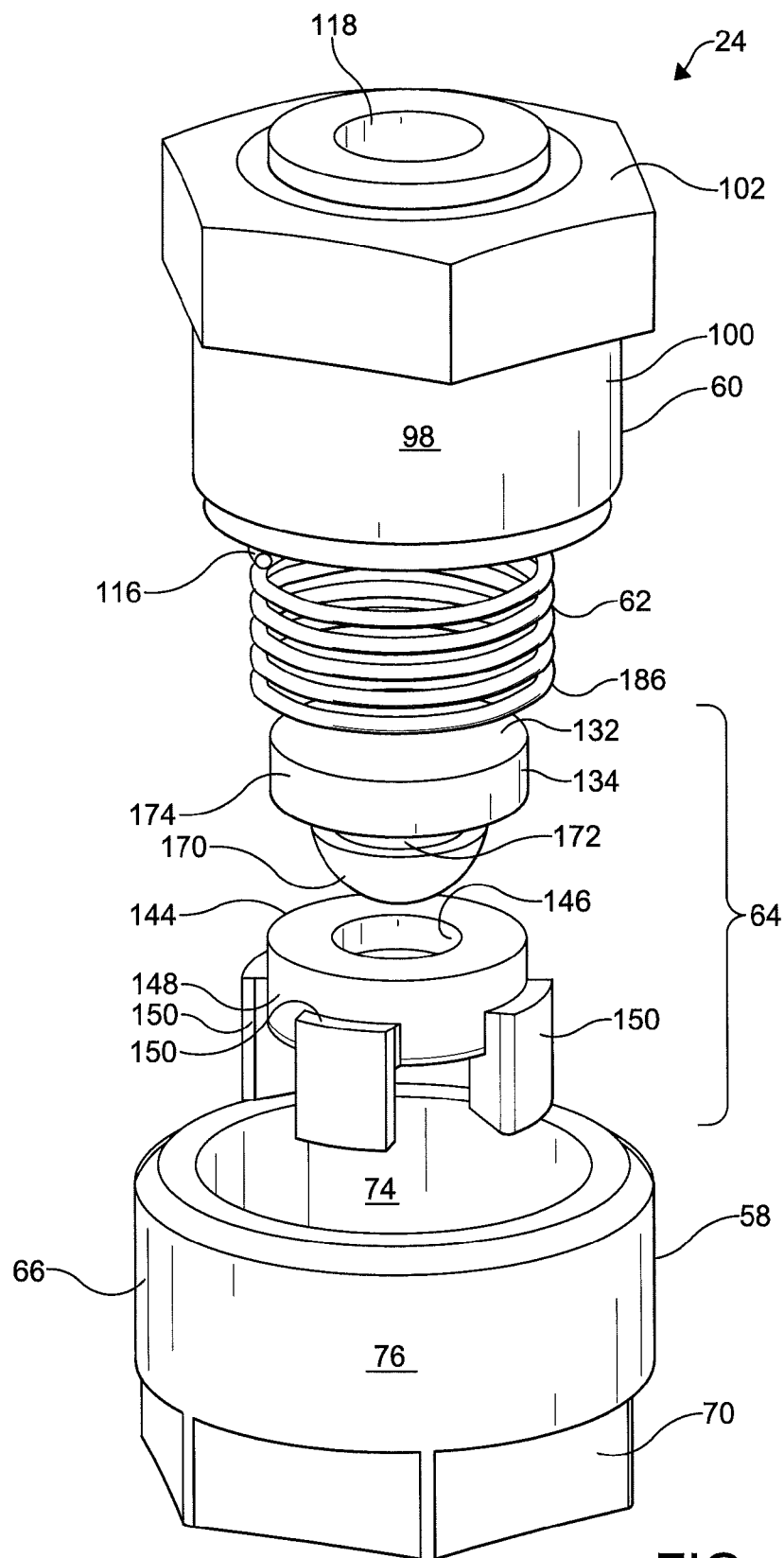
FIG. 4 is an exploded view of the wheel valve assembly of FIG. 3.

As illustrated in FIG. 4, the shuttle assembly 64 comprises a shuttle 144 and the plug member 134. The plug member 134 is engaged with the shuttle 144 via an aperture 146 formed in the shuttle 144. The shuttle assembly 64 is partially disposed in the base cavity. The shuttle assembly 64 is biased towards the lower wall portion 68 of the base portion 58 by the biasing member 62.

The shuttle 144 comprises a main portion 148 and a plurality of shuttle supports 150. Preferably, the shuttle 144 is unitarily formed by injection molding a thermoplastic, preferably polyoxymethylene, such as that sold by E.I. duPont de Nemours and Company under the trademark Delrin®. However, it should be appreciated that the shuttle 144 may be formed using other materials and processes. For example, the shuttle may be formed by machining a metal. It should also be appreciated that the shuttle may be formed by joining a plurality of components.

The main portion 148 is a ring-shaped body. However, it should be appreciated that other shapes may be used. The main portion 148 comprises an outer edge that is sharply defined. A definition of the outer edge may be defined by the process used to form the shuttle 144. The outer edge is shaped to increase a drag force applied to the shuttle assembly 64 by a fluid flowing adjacent thereto. The main portion 148 defines the aperture 146. An outer face of the main portion 148 has a diameter smaller than an inner diameter of the outer wall portion 100 adjacent thereto. A space 157 between the outer face of the main portion 148 and the outer wall portion 100 forms a portion of a fluid passage 158 which exists when the wheel valve assembly 24 is in the open position. A first side of the main portion 148 faces the lower wall portion 68.

The shuttle supports 150 are equally spaced apart and attached to the first side and the outer face of the main portion 148. Preferably, each shuttle support 150 is a generally wedge-shaped body. However, it should be appreciated that the shuttle supports may be shaped differently or be of another shape. As shown best in FIG. 4, each of the shuttle supports 150 comprises an upper edge that is sharply defined. A definition of the upper edges may be defined by the process used to form the shuttle supports 150. The upper edges are shaped to increase a drag force to the shuttle assembly 64 by a fluid flowing adjacent thereto.

The shuttle supports 150 define an outer diameter 164 of the shuttle 144. As shown in FIG. 5A, the outer diameter 164 of the shuttle 144 is smaller than a diameter 166 of the inner face 74 of the base portion 58. Each of the shuttle supports 150 abuts the lower wall portion 68 of the base portion 58 when the wheel valve assembly 24 is in the open position. When the wheel valve assembly 24 is in the open position, the spaces 168 between successive shuttle supports 150 form a portion of the fluid passage 158.

The plug member 134 is an annular body formed from a resilient material. The plug member 134 comprises the sealing surface 132 and a bulbous base 170. A retaining groove 172 is provided between the sealing surface 132 and the bulbous base 170. As shown in FIG. 4, the plug member 134 may be unitarily formed. However, it should be appreciated that the plug member may be formed from a plurality of components.

The sealing surface 132 is formed in a distal end of the plug member 134 opposite the bulbous base 170. The sealing surface 132 is of a circular shape and is preferably flat. However, it is understood that the sealing surface 132 may be of another shape. The sealing surface 132 is sharply defined by an outer edge 174. The outer edge 174 is shaped to decrease a flow rate of the fluid flowing adjacent thereto when the wheel valve assembly 24 is in the open position. The outer edge 174 may be defined by the process used to form the sealing surface 132.

The sealing surface 132 is disposed adjacent the cap perforation 118 and abuts the ridge 130 so as to be in sealing contact therewith when the wheel valve assembly 24 is in the closed position as is shown in FIG. 5. When the wheel valve assembly 24 is in the open position, a space 176 separates the ridge 130 and the sealing surface 132 as is shown in FIG. 5A. Also, when the wheel valve assembly 24 is in the open position, the edge portion 142 of the first portion and an adjacent portion 178 of the sealing surface 132 provide a portion 180 within the wheel valve assembly 24 where the flow rate of the fluid is reduced when compared with other portions of the wheel valve assembly 24 such as, for example, adjacent the ends 84, 86 of the base perforation 78 or adjacent the cap perforation 118 and ridge 130.

Referring back to FIG. 4, the bulbous base 170 preferably has a generally hemispherical shape. However, it should be appreciated that the bulbous base may be of another shape. At least a portion 182 of the bulbous base 170 has a diameter which is of a length that is greater than that of the retaining groove 172. Referring now to FIGS. 5 and 5A, an area between the bulbous base 170 and the shuttle 144 defines a shuttle cavity 184. The shuttle cavity 184 is shaped to increase a drag force applied to the shuttle assembly 64 by a fluid flowing adjacent thereto.

The retaining groove 172 is defined by the area between the sealing surface 132 and the bulbous base 170. The plug member 134 is attached to the shuttle 144 by engaging the main portion 148 and the retaining groove 146. To assembly the shuttle assembly 64 and engage the main portion 148 and the retaining groove 146, the bulbous base 170 is compressed and directed through the aperture 146 and the main portion 148 is aligned with the retaining groove 146.

As illustrated best in FIGS. 5 and 5A, the biasing member 62 is disposed between the base portion 58 and the cap portion 56 adjacent the cap perforation 118. The biasing member 62 contacts the shuttle assembly 64 and applies a force thereto. Preferably, the biasing member 62 applies the force to the shuttle assembly 64 via contact with the plurality of shuttle supports 150.

As shown in FIG. 4, the biasing member 62 is preferably a compression spring such as, for example, a coil spring formed from a spring steel. However, it should be appreciated that the biasing member 62 may be of another kind, type, make and/or formed from another material. The biasing member 62 is pretensioned. To open the wheel valve assembly 24, the biasing member 62 biases the shuttle 144 towards the lower wall portion 68. A first member end 186 of the biasing member 62 abuts each of the shuttle supports 150 and the second member end 116 abuts the cap portion 56.

In an embodiment, the wheel valve assembly 24 also comprises the filter 96. The filter 96 is utilized to prevent dirt and/or debris in the wheel assembly 12 from entering the wheel valve assembly 24. The filter 96 may be conventional in the art. Preferably, the filter 96 is attached to the base portion 58 by a portion 188 thereof being disposed in the groove 94 formed in the stem portion 70.

As aforementioned, the wheel valve assembly 24 may be in the closed position or the open position. In the open position, the fluid passage 158 is provided through the wheel valve assembly 24. The fluid passage 158 comprises the cap perforation 118, base perforation 78, space 150 between the ridge 130 and the shuttle assembly 64, space 190 between the shuttle assembly 64 and the cap portion 56, and one or more of the spaces 192 between the shuttle supports 150.

Figure 6:
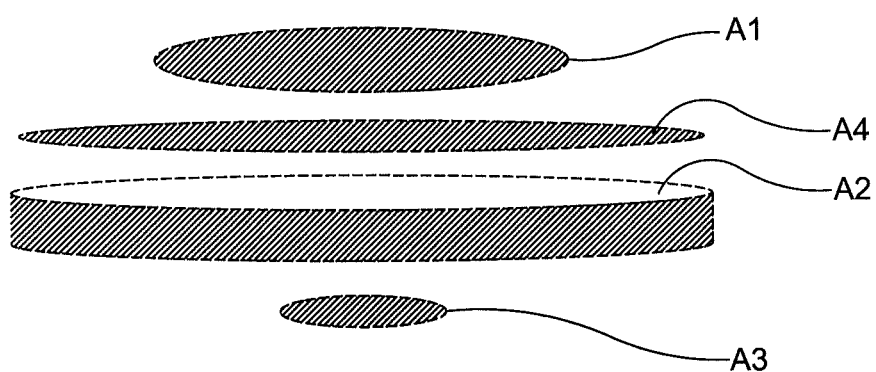
FIG. 6 is a perspective view of certain areas within the wheel valve assembly of FIG. 3.

When a pressure differential between the pressure within the second fluid conduit 48 and the tire pressure is above an opening threshold, the wheel valve assembly 24 is in or placed in the open position. Referring now to FIGS. 5 and 6, a relationship between an area A4 of the sealing surface 132 bounded by the ridge 130 when the wheel valve assembly 24 is in the closed position, the spring rate of the biasing member 62, and the pressure differential between the pressure within the second fluid conduit 48 and the tire pressure determines the opening threshold and facilitates placing the wheel valve assembly 24 in the open position. Preferably, the opening threshold is about 5 psi or more. More preferably, the opening threshold is about 5 to about 8 psi. The wheel valve assembly 24 may be configured to have a specific opening threshold. The wheel valve assembly 24 remains in the open position so long as the pressure differential between the pressure within the second fluid conduit 48 and the tire pressure is above the opening threshold. In the open position, the plug member 134 does not contact the cap portion 56, allowing a flow of the pressurized fluid from the base perforation 78 to the cap perforation 118 through the fluid passage 158 or allowing a flow of the pressurized fluid from the cap perforation 118 to the base perforation 78 through the fluid passage 158.

When a pressure differential between the tire pressure and the pressure within the second fluid conduit 48 is above a closing threshold, the wheel valve assembly 24 is in or placed in the closed position. Preferably, the closing threshold is about 5 to about 8 psi. The wheel valve assembly 24 may be configured to be at a specific closing threshold. In the closed position, the plug member 134 sealingly contacts with the cap portion 56, preventing a flow of the pressurized fluid from the cap perforation 118 to the base perforation 78 or vice versa. The wheel valve assembly 24 remains in the closed position until the system 10 determines that the tire pressure needs to be adjusted.

Referring now to FIGS. 5A and 6, a relationship between an area A1 of the cap perforation 118, an area A2 between the sealing surface 132 and the ridge 130 when the wheel valve assembly 24 is in the open position which corresponds to an area of a side of a right cylinder and an area A3 of the reduced diameter of the base perforation 78 determines the closing threshold and facilitates placing the wheel valve assembly 24 in the closed position. The area A1 must be greater than the area A2, and the area A3 must be greater than the area A2 to obtain the closing threshold that is desirable for use with the tire inflation system. Preferably, the area A3 is about 1.1 times greater than the area A2 and the area A1 is about 3.8 times greater than the area A2. Such a selection of the areas A1, A2, and A3 results in the closing threshold of about 5 to about 8 psi. As above-discussed, when the wheel valve assembly 24 is in the open position, one or more spaces 192 between the shuttle supports 150 forms a portion of the fluid passage 158. A total cross sectional area of the spaces between supports 150 is about equal to the area A1. Also, as illustrated in FIG. 6, the area A4 is larger than the area A1.

Referring back to FIG. 2, on an end 194, the wheel valve assembly 24 is in fluid communication with the chamber 18. On an opposite end 196, the wheel valve assembly 24 is in fluid communication with the second fluid conduit 48. A portion of the second fluid conduit 48 may be formed through the wheel rim 16. In this embodiment, the second fluid conduit 48 may comprise a 90° bend 200.

Referring back to FIG. 1, the pneumatic control unit 34 comprises an inner fluid conduit 202. The inner fluid conduit 202 provides a passageway for directing air through the pneumatic control unit 34. The inner fluid conduit 202 is selectively in fluid communication with the supply conduit 30 via the air supply port 38 and an air supply valve assembly 204.

The air supply valve assembly 204 is operable from an open position to a closed position and vice versa. Preferably, the air supply valve assembly 204 is normally closed. In the open position, the air supply valve assembly 204 allows the air source 22 to communicate with the inner fluid conduit 202 via the supply conduit 30 so that tire pressure can be increased or to enable a wheel valve assembly 24, 24A, 24B, 24C to be opened. In the closed position, the air supply valve assembly 204 prevents fluid communication between the air source 22 and the inner fluid conduit 202.

Preferably, the air supply valve assembly 204 is of the solenoid variety. In an embodiment, the air supply valve assembly 204 comprises a solenoid valve. As illustrated by FIG. 1 and FIG. 8, where the solenoid valve has been removed for clarity, the air supply valve assembly 204 allows for selective fluid communication between the air source 22 and the inner fluid conduit 202.

The inner fluid conduit 202 is also selectively in fluid communication with the channel port 40 via a channel valve assembly 206. Thus, the air supply port 38 is selectively in fluid communication with the channel port 40 via the air supply valve assembly 204, inner fluid conduit 202 and channel valve assembly 206. When the pneumatic control unit 34 comprises more than one channel port 40, 40A, 40B, 40C, separate channel valve assemblies 206, 206A, 206B, 206C are provided to allow selective fluid communication between the inner fluid conduit 202 and each channel port. Also, in these embodiments, the air supply port 38 is selectively in fluid communication with each channel port 40, 40A, 40B, 40C via the air supply valve assembly 204, inner fluid conduit 202 and separate channel valve assemblies 206, 206A, 206B, 206C.

Preferably, the channel valve assembly 206 is of the solenoid variety. In an embodiment, the channel valve assembly 206 comprises a solenoid valve 207 and a cartridge 209. The cartridge 209 has a high flow capacity for enabling the tire pressure of a large wheel assembly to be quickly increased or decreased. Preferably, the cartridge 209 is of the spring variety. The cartridge 209 is selectively in fluid communication with the inner fluid conduit 202 via the solenoid valve 207 and in fluid communication with a side port 211 formed in the body portion 36. The side port 211 is connected to and in fluid communication with the channel port 40 by a fluid conduit 213 which extends through the body portion 36. As illustrated in FIG. 8, where certain solenoid valves have been removed for clarity, it is preferred that each additional channel valve assembly 206A, 206B, 206C provided is as described above and communicates as described above with a side port 40A, 40B, 40C, respectively.

The inner fluid conduit 202 may comprise one or more branches 208, 208A, 208B, 208C, 210. Each branch 208, 208A, 208B, 208C, 210 may selectively be in fluid communication with another portion of the pneumatic control unit 34. In an embodiment, separate branches 208, 208A, 208B, 208C may selectively communicate with each channel port 40, 40A, 40B, 40C via separate channel valve assemblies 206, 206A, 206B, 206C. The channel valve assemblies 206, 206A, 206B, 206C allow the fluid control circuits 42, 42A, 42B, 42C to be isolated from each other and the inner fluid conduit 202. Also, if desired, the channel valve assemblies 206, 206A, 206B, 206C allow the inner fluid conduit 202 to communicate individually with each fluid control circuit 42, 42A, 42B, 42C.

The pneumatic control unit 34 comprises a pressure transducer 212. The pressure transducer 212 measures the tire pressure, measures the pressure of the air from the air source 22, dynamically measures a pressure of the air in the inner fluid conduit 202 and provides signals related thereto. The pressure transducer 212 is in fluid communication with the inner fluid conduit 202 via a port 214 formed in the body portion 36.

Portions of the pneumatic control unit 34 are in communication with a control device 216. When the tire pressure is being increased or decreased, the pressure transducer 212 may dynamically measure the pressure of the air in the inner fluid conduit 202 and provide a signal to the control device 216 which corresponds to the tire pressure. The control device 216 receives a signal from the pressure transducer 212 and may provide a signal to the air supply valve assembly 204, channel valve assembly 206 and a deflate valve assembly 218. The control device 216 may also be in communication with the pressure transducer 212 for reading and displaying the tire pressure.

Preferably, the signal provided by the control device 216 is in the form of an electrical current. For describing the system and method provided herein, when an electrical current is received by the air supply valve assembly 204 or the channel valve assembly 206, the valve assembly will be referred to as being "energized." When no electrical current is received by the air supply valve assembly 204 or the channel valve assembly 206 or when electrical current is removed from the valve assembly, the valve assembly will be referred to as being "de-energized."

When the air supply valve assembly 204 is energized, the supply conduit 30 is in fluid communication with the inner fluid conduit 202 via the air supply port 38. When the air supply valve assembly 204 is de-energized, the supply conduit 30 is not in fluid communication with the inner fluid conduit 202. In order to increase or decrease the tire pressure, the appropriate channel valve assembly 206, 206A, 206B, 206C is energized so that one or more of the fluid control circuits 42, 42A, 42B, 42C is placed into fluid communication with the inner fluid conduit 202. When the channel valve assembly 206 is energized, the inner fluid conduit 202 is in fluid communication with the fluid control circuit 42 via the channel port 40 and the wheel valve assembly 24 via the fluid control circuit 42. When the channel valve assembly 206 is de-energized, the fluid control circuit 42 is not in fluid communication with the inner fluid conduit 202. Each channel valve assembly 206, 206A, 206B, 206C provided can be energized or de-energized as described above to permit or prevent fluid communication between the inner fluid conduit 202 and a selected fluid control circuit 42, 42A, 42B, 42C.

Also, when the channel valve assembly 206 is de-energized, the wheel valve assembly 24 via the fluid control circuit 42 and channel valve assembly 206 is in fluid communication with the atmosphere. As the tire pressure is greater than atmospheric pressure, the wheel valve assembly 24 is moved into the closed position when the channel valve assembly 206 is de-energized. As described above, in the closed position, the wheel valve assembly 24 prevents air from being added to of removed from the wheel assembly 12. Each channel valve assembly 206, 206A, 206B, 206C provided can be de-energized as described above to prevent air from being added to or removed from the wheel assembly 12, 12A, 12B, 12C selectively in fluid communication therewith.

Additionally, when the channel valve assembly 206 is de-energized, the fluid control circuit 42 is in fluid communication with a vent port 220. The fluid control circuit 42 is vented to the atmosphere via the channel valve assembly 206 and the vent port 220. Preferably, each fluid control circuit 42, 42A, 42B, 42C is vented to the atmosphere via the channel valve assembly in fluid communication therewith and the vent port 220. The vent port 220 is in fluid communication with the atmosphere and selectively with one or more of the fluid control circuits 42, 42A, 42B, 42C via the separate channel valve assemblies 206, 206A, 206B, 206C. Preferably, when it is desired to vent the system 10, each channel valve assembly 206, 206A, 206B, 206C is de-energized so that each fluid control circuit 42, 42A, 42B, 42C communicates with the atmosphere. Also, when it is desired to vent the system 10, the deflate valve assembly 218 is open which allows the inner fluid conduit 202 to communicate with the atmosphere via a variable area valve assembly 222.

The variable area valve assembly 222 is in fluid communication with the atmosphere and the deflate valve assembly 218. The deflate valve assembly 218 is operable from an open position to a closed position and vice versa. In the open position, the deflate valve assembly 218 allows the variable area valve assembly 222 to communicate with the inner fluid conduit 202 so that the tire pressure can be decreased or the inner fluid conduit 202 can be vented. In the closed position, the deflate valve assembly 218 prevents fluid communication between the variable area valve assembly 222 and the inner fluid conduit 202. Preferably, the deflate valve assembly 218 is normally in the open position.

Preferably, the deflate valve assembly 218 is of the solenoid variety. In an embodiment, the deflate valve assembly 218 comprises a solenoid valve and a cartridge 219. The cartridge 219 has a high flow capacity for enabling the tire pressure of a large wheel assembly to be quickly decreased. Preferably, the cartridge 219 is of the spring variety. As illustrated by FIG. 8, where the solenoid valve has been removed for clarity, the cartridge 209 is selectively in fluid communication with the inner fluid conduit 202 via the solenoid valve and in fluid communication with a fluid conduit 224 formed in the body portion 36.

The fluid conduit 224 is connected to and in fluid communication with the variable area valve assembly 222. The fluid conduit 224 is provided between the variable area valve assembly 222 and the deflate valve assembly 218 to enable fluid communication therebetween. The variable area valve assembly 222 is selectively in fluid communication with the inner fluid conduit 202 via the deflate valve assembly 218 and fluid conduit 224. When it is desired to decrease tire pressure, the deflate valve assembly 218 is open to enable fluid communication between the variable area valve assembly 222 and the inner fluid conduit 202.

The variable area valve assembly 222 is selectively in fluid communication with the wheel valve assembly 24 via the deflate valve assembly 218, inner fluid conduit 202, channel valve assembly 206 and fluid control circuit 42. In certain embodiments, the variable area valve assembly 222 is selectively in fluid communication with each wheel valve assembly 24, 24A, 24B, 24C capable of fluid communication with the system 10. Preferably, the variable area valve assembly 222 is selectively in fluid communication with each wheel valve assembly 24, 24A, 24B, 24C via the deflate valve assembly 218, inner fluid conduit 202, separate channel valve assemblies 206, 206A, 206B, 206C and separate fluid control circuits 42, 42A, 42B, 42C. When it is desired to decrease the tire pressure of the wheel assembly 12, the variable area valve assembly 222 is in fluid communication with the wheel valve assembly 24 by opening the deflate valve assembly 218 and energizing the channel valve assembly 206. When it is desired to decrease the tire pressure of two or more wheel assemblies 12, 12A, the variable area valve assembly 222 is in fluid communication with the wheel valve assemblies 24, 24A via the deflate valve assembly 218 and the channel valve assemblies 206, 206A associated with the fluid control circuits 42, 42A in fluid communication with the wheel valve assemblies 24, 24A.

Embodiments of the variable area valve assembly 222 are illustrated in FIGS. 1, 8 and 9A-9C.

Referring now to FIG. 9A-9C, the variable area valve assembly 222 comprises a perforation 226. Preferably, the perforation 226 is formed in the body portion 36 of the pneumatic control unit 34. The perforation 226 is attached to and in fluid communication with the fluid conduit 224. The perforation 226 is defined by a wall portion 228 which also at least partially defines an opening 230. The wall portion 228 is tapered and reduces in thickness toward a cavity 232.

The cavity 232 is in fluid communication with the perforation 226 via the opening 230. The opening 230 and perforation 228 separate the cavity 232 from the fluid conduit 224. Preferably, a motor assembly 234 is attached to the body portion 36 and a portion thereof is received by the cavity 232. Preferably, the motor assembly 234 comprises a motor which is of the stepper variety.

Referring now to FIGS. 1, 8 and 9A-9C, a shaft 236 extends from the motor assembly 234 into the cavity 232. The motor assembly 234 incrementally extends and retracts the shaft 236. As noted above, when the tire pressure is being decreased, the pressure transducer 212 dynamically measures a pressure of the air in the inner fluid conduit 202 and provides a signal to the control device 216 corresponding to the tire pressure. The control device 216 receives a signal from the pressure transducer 212 and provides a signal to the motor assembly 234 which causes the motor assembly 234 to extend or retract the shaft 236.

The shaft 236 is attached to a valve member 238 at a first end 239 thereof. The valve member 238 has a centerline 240 which is aligned with the shaft 236. The valve member 238 is movable toward or away from the perforation 226 via the shaft. When the shaft 236 extends, valve member 238 moves toward the perforation 226. When the shaft 236 retracts, valve member 238 moves away from the perforation 226.

Preferably, the valve member 238 has an outer surface 242 which is unbroken for air to flow thereover. The valve member 238 may have a generally frusto-conical shape. The valve member 238 comprises a first diameter portion 244 and a second diameter portion 246. The second diameter portion 246 is provided adjacent the fluid conduit 224. In an embodiment, the first diameter portion 244 has a diameter which is greater than the second diameter portion 246. The valve member 238 gradually tapers from the first diameter portion 244 to a reduced diameter at the second diameter portion 246. Preferably, the taper has a steepness (relative to the centerline) which is selected based on the maximum tire pressure. For example, at a maximum tire pressure of 100 psi or more, the steepness of the taper may be selected to be greater than the steepness of the taper when the maximum tire pressure is less than 100 psi.

The valve member 238 is positioned relative to the wall portion 228. The opening 230 is formed between the wall portion 228 and the valve member 238. Under certain tire pressure conditions, the valve member 238 partially defines the opening 230. The opening 230 is preferably provided between the fluid conduit 224 and cavity 232. The opening 230 is in fluid communication with the inner fluid conduit 202 when deflate valve assembly 218 is in the open position.

Air within the wheel assembly 12 is expelled through the opening 230 when the tire pressure is being decreased. As best shown in FIGS. 9B-9C, the opening 230 comprises an area A5. Area A5 has a flow capacity. The flow capacity of area A5 is selected to be less than the flow capacity through area A1.

In embodiments where the tire pressure of two or more wheel assemblies 12, 12A is being decreased, air within the wheel assemblies 12, 12A is expelled through the opening 230. In these embodiments, the area A5 has a flow capacity which is less than the flow capacity of the sum of the areas A1 of the wheel assemblies 12, 12A having their tire pressures decreased. In certain embodiments, area A5 has a flow capacity which is about 85 percent or less of the flow capacity through area A1. If the tire pressure of the two or more wheel assemblies 12, 12A is being decreased, the area A5 has a flow capacity which is about 85 percent or less of the flow capacity through the sum of the areas A1 of the wheel assemblies 12, 12A. Preferably, A5 has a flow capacity which is about 75 percent of the flow capacity through area A1 or the sum of areas A1 when more than one tire pressure is being decreased. Since area A5 has a flow capacity which is less than the flow capacity through area A1, the pressure necessary for the wheel valve assembly 24 or assemblies to remain in the open position is provided as the tire pressure is being decreased.

With reference to FIGS. 9A-9C, area A5 is of a size which is variable. The size of area A5 may vary depending on the tire pressure and the desired decrease in tire pressure. When the tire pressure of one or more wheel assemblies 12, 12A, 12B, 12C is being decreased, the size of area A5 may increase as the tire pressure decreases to maintain or substantially maintain the selected flow capacity.

When the tire pressure of one or more wheel assemblies 12, 12A, 12B, 12C is being decreased, the control device 216 receives a signal from the pressure transducer 212 and provides a signal to the motor assembly 234. The signal received by the motor assembly 234 causes the motor assembly 234 to extend or retract the valve member 238 via the shaft 236. The motor assembly 234 incrementally extends and retracts the valve member 238 to increase or decrease the size of area A5 to change the flow capacity of area A5 and control the pressure necessary to keep the wheel valve assembly 24 open. Preferably, the length of the increment that the valve member 238 extends or retracts is predetermined.

The perforation 226 is sized to receive one or more portions 244, 246 of the valve member 238. The tire pressure determines which portion 244, 246 of the valve member 238, if any, is received by the perforation 226 and defines the area A5. Thus, when the tire pressure is decreased, area A5 may vary in size depending on the initial tire pressure and the selected tire pressure.

Referring now to FIGS. 9A-9C, the area A5 will be described with reference to certain tire pressure conditions and the tire pressure decreasing. FIGS. 9A-9C depict a change in the size of area A5 as the tire pressure is decreased. When the tire pressure is high as represented by FIG. 9A, the area A5 is smaller than when the tire pressure is lower as represented by FIGS. 9B and 9C. Also, as is depicted by FIGS. 9A-9C, the size of the area A5 increases as the tire pressure decreases. Increasing the size of the area A5 as the tire pressure decreases allows the flow capacity through area A5 to remain substantially constant.

As the tire pressure is decreased, the flow rate of the air being expelled through the opening 230 is reduced. As the flow rate is reduced, the valve member 238 is generally retracted toward the cavity 232 and away from the perforation 226 to increase the size of area A5 so that the flow rate of air expelled through the opening 230 is substantially maintained, the flow capacity of area A5 relative to the flow capacity of area A1 is maintained and the pressure needed to keep the one or more wheel valve assemblies 24 in the open position is provided. Thus, the system 10 allows the flow rate through the opening 230 and the pressure to maintain the wheel valve assembly 24 in the open position to be controlled as the tire pressure is decreased. Also, as shown in FIG. 13, as the tire pressure decreases over time the flow rate through the opening 230 does not rapidly drop and is gradually reduced.

As mentioned above, a representation of a high tire pressure condition is illustrated in FIG. 9A. Under a high tire pressure condition such as, for example, a tire pressure of 110 psi, the first diameter portion 244 is received by the perforation 226 and defines area A5 along with the wall portion 228. FIG. 9B illustrates area A5 when tire pressure is lower than under the tire pressure condition described above and illustrated by FIG. 9A. In this embodiment, a portion of the valve member 238 received by the perforation 226 and defines area A5 along with the wall portion 228. FIG. 9C illustrates area A5 when tire pressure is lower than under the conditions described above and illustrated by FIGS. 9A and 9B. In this embodiment, the second diameter portion 246 is received by the perforation 226 and defines area A5 along with the wall portion 228. When the tire pressure is lower than the tire pressure conditions described above and represented by FIG. 9A-9C, the valve member 238 may not be received by the perforation 226. Under such low tire pressure conditions, the valve member 238 may be position within the cavity 232 and the area A5 is defined solely by the wall portion 228 of the variable area valve assembly 222.

A guide rod 248 is attached to a second end 250 of the valve member 238. The guide rod 248 extends through the perforation 226 and into the body portion 36 and is aligned with the centerline 240 of the valve member 238 and the shaft 236. The guide rod 248 allows the valve member 238 to maintain its position relative to the wall portion 228 so that the area A5 is uniform.

Figure 10:
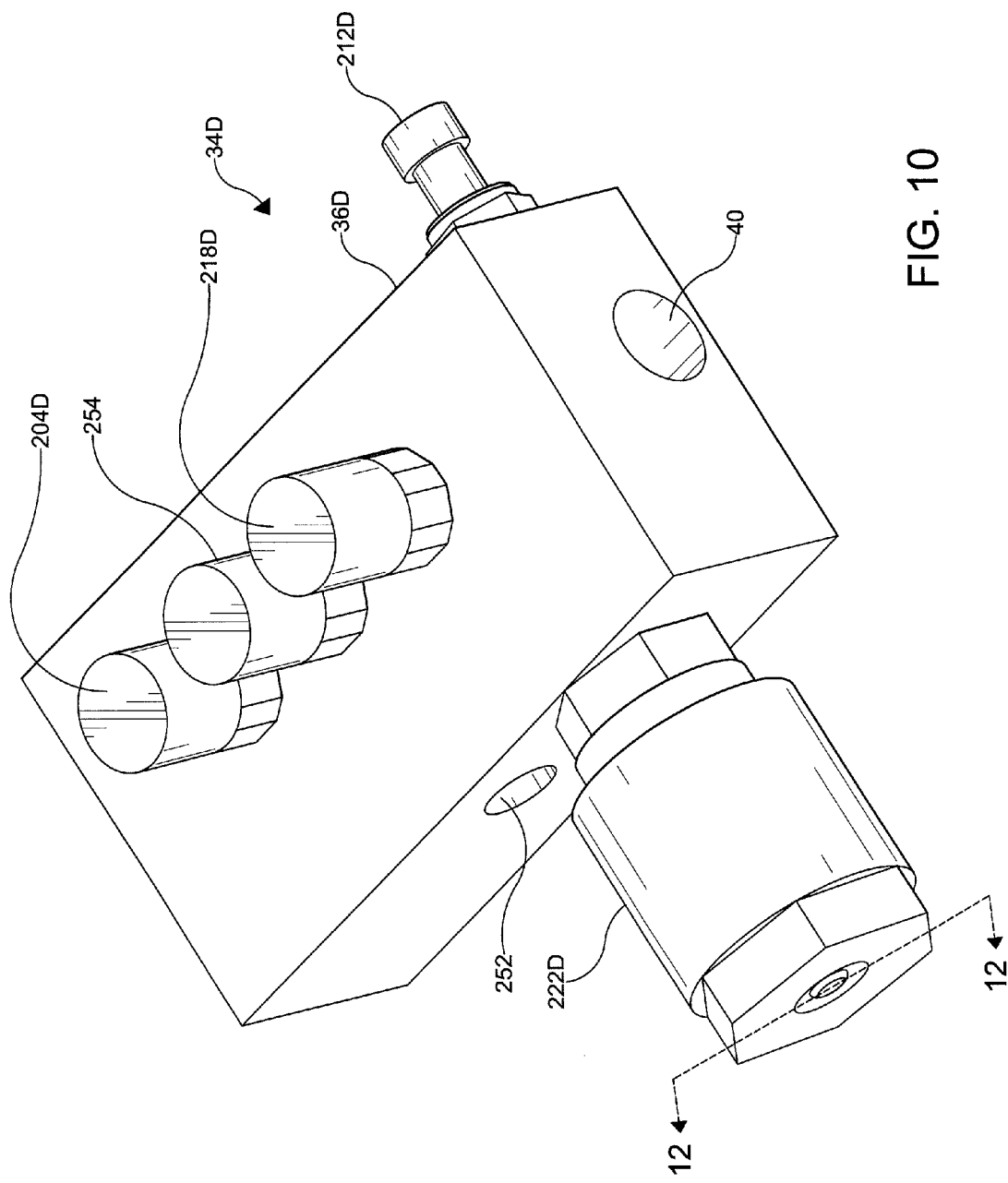
FIG. 10 is a perspective view of a valve assembly and portions of another pressure control unit in accordance with an embodiment of the system.
Figure 11:
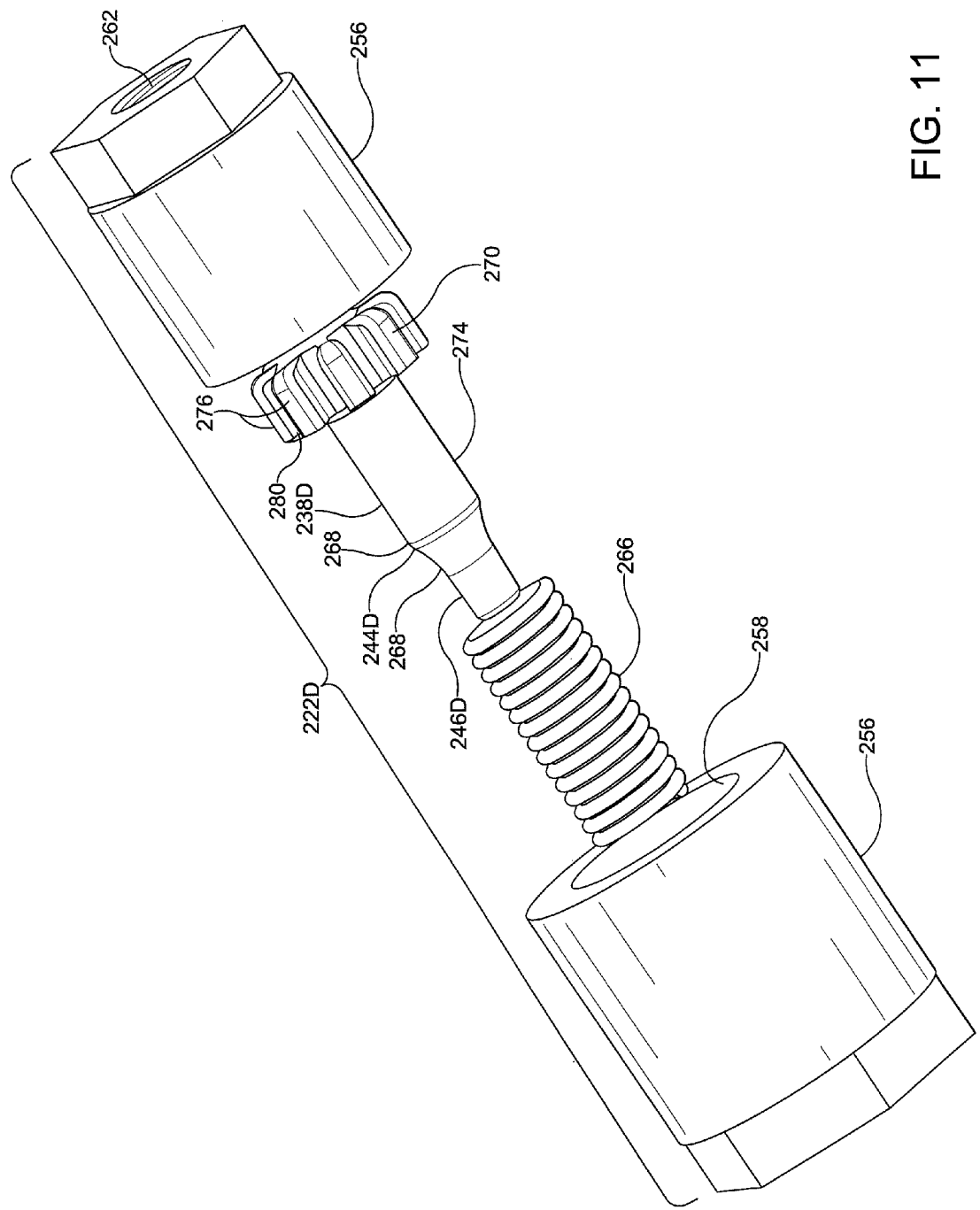
FIG. 11 is an exploded view of the valve assembly of FIG. 10.
Figure 12:
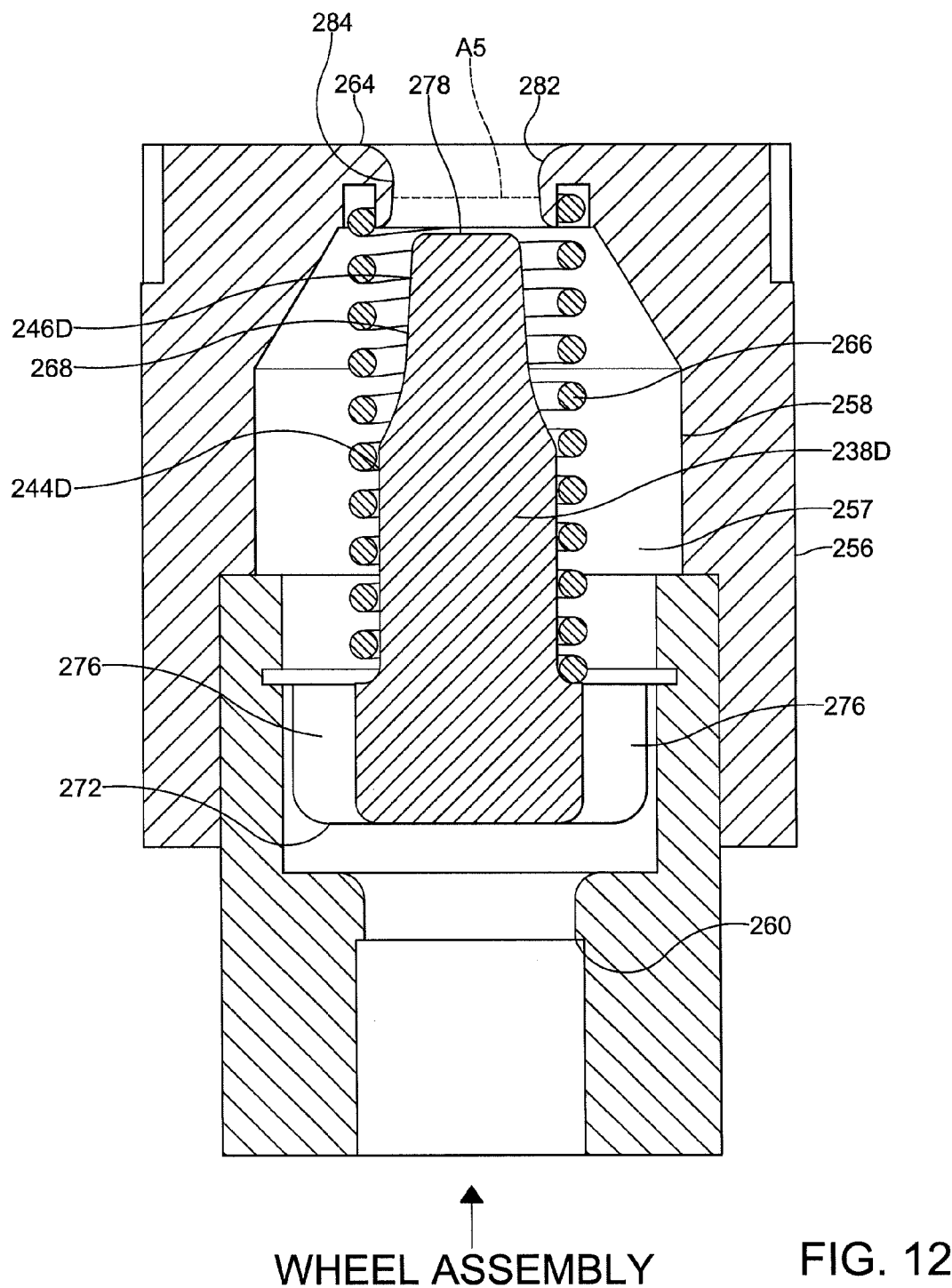
FIG. 12 is a cross-sectional view of the valve assembly of FIG. 10 taken along line 12-12.

Other embodiments of a variable area valve assembly 222D and a pneumatic control unit 34D are illustrated in FIG. 10-12. When utilizing the variable area valve assembly 222D and pneumatic control unit 34D in the system 10, it is preferred that the tire pressure of only one wheel assembly 12 be decreased therewith. However, the variable area valve assembly 222D and pneumatic control unit 34D may be utilized to decrease the tire pressure of a plurality of wheel assemblies 12, 12A, 12B, 12C.

The pneumatic control unit 34D may be utilized as described above. The pneumatic control unit 34D comprises an air supply port (not depicted) and a channel port 40. The air supply port and channel port 40 may be as described above. The air supply port and channel port 40 are formed in a body portion 36D on opposite ends thereof.

On one end, the air supply port is in fluid communication with an air source 22. The air source 22 is as described above. On an opposite end, the air supply port is selectively in fluid communication with an inner fluid conduit (not depicted). The inner fluid conduit may be as described above and is provided between the air supply port and channel port 40 and provides a passageway through the body portion 36D to enable fluid communication between the air supply port and channel port 40. The inner fluid conduit may comprise a first portion and a second portion which are aligned and of varying diameters.

The inner fluid conduit is in fluid communication with one or more side ports 252 formed in the body portion 100 and an air supply valve assembly 204D, vent valve assembly 254 and deflate valve assembly 218D. Preferably, the valve assemblies 204D, 218D, 254 are of the solenoid variety. In this embodiment, each valve assembly 204D, 218D, 254 comprises a solenoid valve and a pair of cartridges. The solenoid valves and cartridges are as described above.

The air supply valve assembly 204D allows and prevents fluid communication between the air supply port and the inner fluid conduit. Preferably, the air supply valve assembly 204D is as and operates as described above. The pneumatic control unit also comprises a pressure transducer 212D. Preferably, the pressure transducer 212D measures the tire pressure, measures the pressure of the air from the air source 22, dynamically measures a pressure of the air in the inner fluid conduit and provides signals related thereto as is described above. The pressure transducer 212D is in fluid communication with the inner fluid conduit via a port formed in the body portion 36D.

The inner fluid conduit is in fluid communication with the channel port 40 on an end thereof. The channel port 40 is also in fluid communication with the wheel valve assembly 24 via a fluid control circuit 42. Preferably, the fluid control circuit 42 is as described above.

The variable area valve assembly 222D is attached to the pneumatic control unit 34D and is selectively in fluid communication with the inner fluid conduit via the deflate valve assembly 218D. The deflate valve assembly 218D may be as and operate as described above.

As depicted in FIG. 11, the variable area valve assembly 222D comprises a housing 256. As depicted in FIG. 12, a cavity 257 is defined by inner surfaces 258 of the housing 256. The cavity 257 may have a generally cylindrical shape. A second port 260 is in fluid communication with the cavity 257 at an end of the cavity. The second port 260 may have a threaded connection portion 262 for attaching the variable area valve assembly 222D to a side port. On an opposite end, the cavity 257 is in fluid communication with a first port 264. The first port 264 is also in fluid communication with the atmosphere.

Air within the wheel assembly 24 is expelled through the first port 264 when the tire pressure is being decreased. Also, pressurized air within the system 20 is expelled through the first port 264 when the system is being vented. In the embodiments illustrated in FIGS. 10-12 when it is desired to vent the system, pressurized air is discharged through the vent valve assembly 254, deflate valve assembly 218D, each side port 252 and the variable area valve assembly 222D to the atmosphere.

A biasing member 266 and a valve member 238D are housed within the cavity 257. In an embodiment, the biasing member 266 is resilient and a spring such as, for example, a coil spring formed from a spring steel. The biasing member 266 is disposed adjacent a perforation 282. The biasing member 266 contacts the valve member 238D and biases the valve member 238D away from the perforation 282 and toward the second port 260.

The second port 260, biasing member 266, valve member 238D, and first port 264 are axially aligned. The biasing member 266 is retained in a concave portion (not depicted) of the inner surface 258 of the housing 256 and contacts the inner surface 258 adjacent the first port 264. A portion of the biasing member 266 and a portion of the valve member 238D are engaged.

The valve member 238D comprises a first portion 268 and a second portion 270. The first portion 268 comprises a first diameter portion 244D and a second diameter portion 246D. The first portion 268 also comprises a first end 272 and a cylindrical portion 274. The second portion 270 comprises a plurality of supports 276 attached to the first portion adjacent the first end 272. The cylindrical portion 274 is attaches to the first diameter portion 244D on an end and the second portion 270 on an opposite end.

The first diameter portion 244D has a diameter which is greater than the second diameter portion 246D. The first diameter portion 244D gradually reduces in diameter from to the second diameter portion 246D. The first diameter portion 244D and second diameter portion 246D each gradually reduce in diameter towards a second end 278.

Preferably, the plurality of supports 276 are equally and circumferentially spaced apart. The supports 276 may contact the inner surface 258 of the housing 256. Preferably, the supports 184 are similarly sized. The space 280 provided between adjacent supports 276 is sized to allow a desired amount of air flow therethrough. Preferably, the spaces 280 are similarly sized and spaced.

The valve member may also comprise at least one spacer (not depicted) provided on an end surface of a supports. Preferably, a spacer is provided on each end surface of the plurality of supports. The spacer(s) provide a gap (not depicted) between the inner surface 258 of the housing 256 and the second portion 270.

Preferably, the variable area valve assembly 222D comprises an area A5 formed in a perforation 282 provided between the first port 264 and the cavity 257. The perforation 282 is defined by a wall portion 284. The area A5 is defined by the wall portion 284 and, under certain tire pressure conditions when the tire pressure is being decreased, a portion 244D, 246D of the valve member 238D. The area A5 functions and is as described above having a flow capacity which is less than the flow capacity through A1. Since A5 has a flow capacity which is less than the flow capacity through A1, it provides the pressure necessary for the wheel valve assembly 24 to remain open when the tire pressure is being decreased.

When tire pressure decreased, pressurized air enters the variable area valve assembly 222D through the second port 260 and flows through the cavity 257 to the first port 264. When the pressurized air enters the chamber 148 it provides a bias to the valve member 238D and urges the valve member toward the biasing member 266 and the perforation 282. As the valve member 238D is urged toward the first port 264, it compresses the biasing member 266 and is received by the perforation 282. When the perforation 282 receives the valve member 238D, the area A5 is defined by the portion 244D, 246D received thereby.

As the tire pressure is decreased, the bias provided by the pressurized air to the valve member 238D is reduced. When the bias provided by the pressurized air is reduced, the biasing member urges the valve member 238D back toward the second port 260. As the valve member 238D moves toward the second port 260, another portion of the valve member 238D may be received by the first perforation 282 and define the area A5. Thus, as described above, the size of area A5 can vary depending on the tire pressure to provide a selected flow capacity.

A method of decreasing the tire pressure will be described with reference to FIGS. 1-9. The method will be described primarily with reference to the tire pressure of one wheel assembly. However, the method is also suitable for use in decreasing the tire pressure of one or more wheel assemblies simultaneously.

The method may comprise selecting a target tire pressure. In these embodiments, the pressure of the air supplied from the air source 22 may be measured utilizing the pressure transducer 212 and compared utilizing the control device 66 to the target tire pressure. If the pressure of the air supplied from the air source 22 is less than the target tire pressure, the method may comprise waiting a predetermined period of time and re-measuring the pressure of the air supplied from the air source 22. This step may be repeated until the pressure of the air supplied from the air source 22 is greater than the target tire pressure.

The method may also comprise measuring the tire pressure of the wheel assembly 12. To measure the tire pressure, the air supply valve assembly 204 and the channel valve assembly 206 are energized and the deflate valve assembly 218 is closed so that the supply conduit 30 and the fluid control circuit 42 are in fluid communication via the inner fluid conduit 202. When the air supply valve assembly 204 is energized, the air source 22 provides a stream of air to the system 10. The stream of air flows through the inner fluid conduit 202, channel valve assembly 206, channel port 40, first fluid conduit 44, rotary joint 46, and second fluid conduit 48, to open the wheel valve assembly 24. Once the wheel valve assembly 24 is open, the tire pressure can be measured utilizing the pressure transducer 212. These steps may be repeated to measure the tire pressure of additional wheel assemblies 12A, 12B, 12C.

The method may comprise determining if one or more of the tire pressures measured is greater than or less than the target tire pressure.

If a tire pressure is less than the target tire pressure, the tire pressure is increased. To increase the tire pressure, the air supply valve assembly 204 and the channel valve assembly 206 are energized and the deflate valve assembly 218 is closed so that the supply conduit 30 and fluid control circuit 42 are in fluid communication via the inner fluid conduit 202. When the air supply valve assembly 204 is energized, the air source 22 provides a stream of air to the system 10. The stream of air flows through the inner fluid conduit 202, channel valve assembly 206, channel port 40, first fluid conduit 44, rotary joint 46, second fluid conduit 48, wheel valve assembly 24 and into the chamber 18 to increase the tire pressure. The pressure transducer 212 can measure a pressure in the inner fluid conduit 202 which corresponds to the tire pressure as the tire pressure is being increased. Alternatively, the air supply valve assembly 204 can be de-energized and then the tire pressure can be measured as described above. If the tire pressure measured is less than the target tire pressure, the air supply valve assembly 204 is energized and the tire pressure is increased by repeating the above-described steps as needed until the tire pressure is equal to the target tire pressure. These steps may be repeated to increase the tire pressure of additional wheel assemblies 12A, 12B, 12C individually or simultaneously with the wheel assembly 12.

If the tire pressure is greater than the target tire pressure, the tire pressure is decreased.

To decrease the tire pressure, the air supply valve assembly 204 and the channel valve assembly 206 are energized so that the supply conduit 30, inner fluid conduit 202 and fluid control circuit 40 are in fluid communication. In this embodiment, the air source 22 provides a stream of air which flows through the inner fluid conduit 202 and fluid control circuit 42 to open the wheel valve assembly 24. Next, the air supply valve assembly 204 is de-energized and the deflate valve assembly 218 is opened.

During this step, the variable area valve assembly 222 is provided in fluid communication with the wheel valve assembly 24 and the wheel assembly 12. When the deflate valve assembly 218 is opened, a stream of air is directed from the chamber 18 through the through the wheel valve assembly 24, second fluid conduit 48, rotary joint 46, first fluid conduit 44, channel valve assembly 206, inner fluid conduit 202, deflate valve assembly 218 and the variable area valve assembly 222 to the atmosphere to decrease the tire pressure.

Since the area A5 has a flow capacity which is less than the flow capacity through area A1, the pressure to maintain the wheel valve assembly 24 in the open position is provided. As discussed above, the flow capacity of the air through the area A5 of the variable area valve assembly 222 is about 85 percent or less of the flow capacity through area A1 of the wheel valve assembly 24. Preferably, the area A5 has a flow capacity which is about 75 percent of the flow capacity through area A1. The wheel valve assembly 24 can be maintained in the open position until the tire pressure is decreased to the target tire pressure. The pressure transducer 212 can measure a pressure of the air in the inner fluid conduit 202 and provide a signal which corresponds to the tire pressure as the air is being removed from the wheel assembly 12. If the tire pressure is greater than the selected pressure, the tire pressure can be decreased until the tire pressure is equal to the target tire pressure.

In an embodiment, the method comprises decreasing a plurality of tire pressures simultaneously. In this embodiment, the tire pressures are equalized before being decreased. Preferably, the tire pressures are equalized by decreasing the tire pressure of the wheel assembly having the highest tire pressure to be equal to or about equal to the tire pressure of the wheel assembly having the lowest tire pressure. The step of decreasing the tire pressure of the wheel assembly having the highest tire pressure to be equal to or about equal to the tire pressure of the wheel assembly having the lowest tire pressure can be repeated as required until the tire pressures of the wheel assemblies are equal to each other. Once the tire pressures to be decreased are equal or about equal, the tire pressures can be decreased by opening the wheel valve assemblies simultaneously as described above and directing streams of air from the chambers through the wheel valve assemblies, fluid control circuits, channel valve assemblies, inner fluid conduit, deflate valve assembly and the variable area valve assembly to the atmosphere.

If the pressure transducer 212 measures a pressure in the inner fluid conduit 202 indicative of the tire pressure which is equal to the target tire pressure, decreasing the tire pressure is completed. Once decreasing the tire pressure is completed, the channel valve assembly 206 is de-energized. If a plurality of tire pressures were being decreased simultaneously, the channel valve assemblies utilized to decrease the tire pressures are de-energized. As noted above, when a channel valve assembly 206, 206A, 206B, 206C is de-energized the wheel valve assembly 24, 24A, 24B, 24C in fluid communication therewith is moved into the closed position. With the wheel valve assembly in the closed position, further decreases in tire pressure are prevented as additional air is prevented from being removed from the wheel assembly.

In certain embodiments, the tire pressure is measured and is determined to be equal to the target tire pressure. Once the tire pressure is equal to the target tire pressure, increasing or decreasing the tire pressure is not desired. In these embodiments, the method may comprise venting the system 10, i.e. discharging pressure above normal atmospheric pressure present within the pneumatic control unit 34 and one or more of the fluid control circuits 42, 42A, 42B, 42C. Additionally, it may be desired to vent the system 10 where communication or power is lost to the system 10.

To vent the system 10, the air supply valve assembly 204, channel valve assembly 206 are de-energized and deflate valve assembly 218 is open. The air supply valve assembly 204 and channel valve assembly 206 may be de-energized and the deflate valve assembly may be opened by a signal (or lack thereof) from the control device 66 or if power is lost to the system 10. If the system comprises more than one fluid control circuit, then additional channel valve assemblies 206A, 206B, 206C may be de-energized to vent the fluid control circuits.

As noted above, the vent port 220 is in fluid communication with the atmosphere and selectively in fluid communication with the fluid control circuit 42. When the channel valve assembly 206 is de-energized, the fluid control circuit 42 is in fluid communication with the atmosphere via the vent port 220. If the air within the fluid control circuit 42 is at a pressure which is greater than normal atmospheric pressure, a stream of air flows from out of the circuit 42 through the channel valve assembly 206 and vent port 220 to equalize the pressure between the circuit 42 and the atmosphere. Preferably, each fluid control circuit 42, 42A, 42B, 42C is vented to the atmosphere via the vent port 220. Therefore, if the system 10 comprises additional fluid control circuits 42A, 42B, 42C, the system is vented by de-energizing the channel valve assemblies 206, 206A, 206B, 206C so that the vent port 220 is in fluid communication with the atmosphere and the fluid control circuits 42, 42A, 42B, 42C. Also, when it is desired to vent the system 10, the deflate valve assembly 218 is open which allows the inner fluid conduit 202 to communicate with the atmosphere via the variable area valve assembly 222. A stream of air may flow from out of the inner fluid conduit 202 through the deflate valve assembly 218 and variable area valve assembly 222 to equalize the pressure between the inner fluid conduit 202 and the atmosphere. The pressure in the fluid control circuit 42 and the inner fluid conduit 202 can be measured by the pressure transducer 212. If the pressure of the air in the fluid control circuit 42 and the inner fluid conduit 202 is equal to atmospheric pressure, venting the system is complete.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

What we claim is:
1. A system, comprising:
  a wheel assembly which defines a chamber that houses a pressurized fluid;
  a wheel valve assembly attached to the wheel assembly and in fluid communication with the chamber, the wheel valve assembly operable between an open position and a closed position and comprising an area having a first flow capacity; and
  a variable area valve assembly selectively in fluid communication with the wheel valve assembly, the variable area valve assembly comprising an area formed in a perforation that has a second flow capacity, the second flow capacity being less than the first flow capacity; and
  a channel valve assembly in fluid communication with the wheel valve assembly via a fluid control circuit and selectively in fluid communication with the variable area valve assembly, the channel valve assembly permitting fluid communication between the fluid control circuit and an inner fluid conduit or between the fluid control circuit and atmosphere.

2. The system of claim 1, wherein the wheel valve assembly is in fluid communication with a channel port via the fluid control circuit.

3. The system of claim 1, further comprising a pneumatic control unit, wherein the inner fluid conduit is provided in the pneumatic control unit and is selectively in fluid communication with the variable area valve assembly.

4. The system of claim 1, further comprising a pressure transducer which dynamically measures a pressure of the pressurized fluid and provides a signal to a control device which corresponds to a tire pressure.

5. The system of claim 1, wherein the area formed in the perforation varies in size.

6. The system of claim 1, wherein the area formed in the perforation is defined by a wall portion and an outer surface of a valve member.

7. The system of claim 1, wherein the perforation is sized to receive a portion of a valve member.

8. The system of claim 1, wherein the pressurized fluid is air.

9. The system of claim 1, wherein the variable area valve assembly is in fluid communication with a solenoid valve assembly via a fluid conduit and the atmosphere.

10. The system of claim 1, wherein the variable area valve assembly further comprises a valve member which is movable toward or away from the perforation.

11. The system of claim 1, wherein the variable area valve assembly further comprises a valve member movable toward or away from the perforation via a shaft which extends or retracts due to a signal provided to a motor assembly from a control device.

12. The system of claim 1, wherein the area having the first flow capacity is formed in a cap perforation provided in the wheel valve assembly.

13. The system of claim 2, wherein the fluid control circuit comprises a first fluid conduit, a rotary joint and a second fluid conduit.

14. The system of claim 3, wherein the inner fluid conduit is selectively in fluid communication with a source of pressurized fluid.

15. The system of claim 3, wherein the inner fluid conduit is selectively in fluid communication with the wheel valve assembly.

16. The system of claim 5, wherein the area increases in size as pressurized fluid is removed from the chamber.

17. The system of claim 6, wherein the valve member gradually reduces in diameter toward an end thereof.

18. The system of claim 7, wherein the valve member comprises a first diameter portion and a second diameter portion.

19. The system of claim 10, wherein a guide rod is attached to an end of the valve member and extends through the perforation.

* * * * *